United States Patent
Ohta et al.

(10) Patent No.: US 8,135,385 B2
(45) Date of Patent: Mar. 13, 2012

(54) MOBILE TERMINAL, ACCESS CONTROL MANAGEMENT DEVICE, AND ACCESS CONTROL MANAGEMENT METHOD

(75) Inventors: Ken Ohta, Yokohama (JP); Takashi Yoshikawa, Yokohama (JP); Akira Kinno, Yokohama (JP); Hiroshi Inamura, Cupertino, CA (US)

(73) Assignee: NTT DoCoMo, Inc., Tokyo (JP)

( * ) Notice: Subject to any disclaimer, the term of this patent is extended or adjusted under 35 U.S.C. 154(b) by 884 days.

(21) Appl. No.: 12/089,936

(22) PCT Filed: Oct. 13, 2006

(86) PCT No.: PCT/JP2006/320484
§ 371 (c)(1),
(2), (4) Date: Aug. 11, 2008

(87) PCT Pub. No.: WO2007/043659
PCT Pub. Date: Apr. 19, 2007

(65) Prior Publication Data
US 2009/0221266 A1   Sep. 3, 2009

(30) Foreign Application Priority Data
Oct. 13, 2005 (JP) ............................... P2005-299232

(51) Int. Cl.
*H04M 1/66* (2006.01)
(52) U.S. Cl. ......... 455/411; 455/410; 455/419; 455/420
(58) Field of Classification Search .......... 455/410–411, 455/414.1–414.4, 418–420
See application file for complete search history.

(56) References Cited

U.S. PATENT DOCUMENTS

| | | | | |
|---|---|---|---|---|
| 5,974,312 A * | 10/1999 | Hayes et al. | ........... | 455/419 |
| 6,594,483 B2 * | 7/2003 | Nykanen et al. | ........... | 455/411 |
| 6,731,731 B1 * | 5/2004 | Ueshima | ........... | 379/196 |
| 7,142,848 B2 * | 11/2006 | Owen et al. | ........... | 455/418 |
| 7,689,205 B2 * | 3/2010 | Toy et al. | ........... | 455/411 |
| 7,720,463 B2 * | 5/2010 | Marsico | ........... | 455/410 |
| 7,773,976 B2 * | 8/2010 | Agrawal et al. | ........... | 455/414.3 |

(Continued)

FOREIGN PATENT DOCUMENTS

JP    07-193865    7/1995

(Continued)

*Primary Examiner* — Sharad Rampuria
(74) *Attorney, Agent, or Firm* — Marvin A. Motsenbocker; MOTS Law, PLLC

(57) ABSTRACT

A mobile terminal (200) comprises an application execution unit (240) configured to execute an application program; an access control rule management unit (270) configured to retain an access control rule defining whether the application program has an access authorization to a confidential resource in the mobile terminal and a determining unit; an access control rule query unit (220) configured to acquire, from an external device, the access control rule by designating at least one of an identifier of a user identity module installed in the mobile terminal and an identifier of the mobile terminal, and to retain the acquired access control rule in the access control management unit; a query requirement determination unit (260) configured to determine whether to update the access control rule when the application program makes an access to the confidential resource, and to update the access control rule; an authorization management unit (230) configured to determine whether the application program has the access authorization based on the access control rule; and a confidential resource management unit (250) configured to determine whether to permit an access request to the confidential resource by the application program, based on a result of the determination of the authorization management unit (230).

11 Claims, 15 Drawing Sheets

U.S. PATENT DOCUMENTS

| | | | |
|---|---|---|---|
| 7,848,780 B2 * | 12/2010 | Washio et al. | 455/558 |
| 7,929,954 B2 * | 4/2011 | Choti et al. | 455/414.1 |
| 2002/0099665 A1 * | 7/2002 | Burger et al. | 705/67 |
| 2003/0032409 A1 * | 2/2003 | Hutcheson et al. | 455/414 |
| 2003/0135748 A1 * | 7/2003 | Yamada et al. | 713/193 |
| 2004/0049693 A1 * | 3/2004 | Douglas | 713/200 |
| 2005/0222933 A1 * | 10/2005 | Wesby | 705/36 |

FOREIGN PATENT DOCUMENTS

| | | |
|---|---|---|
| JP | 08-314805 | 11/1996 |
| JP | 2003-006185 | 1/2003 |
| JP | 2003-228520 | 8/2003 |
| JP | 2004-252584 | 9/2004 |
| JP | 2004-356685 | 12/2004 |
| JP | 2006-222728 | 8/2006 |

* cited by examiner

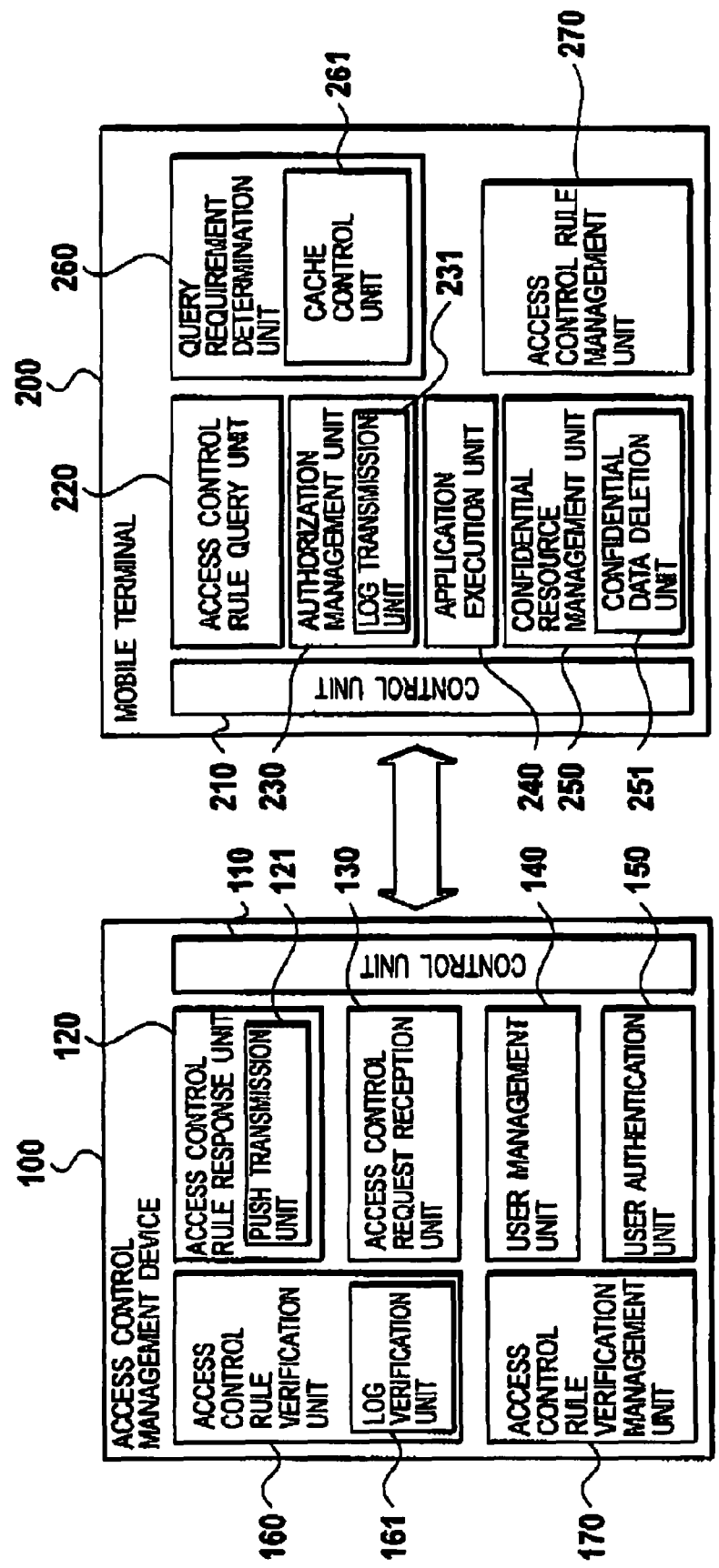

FIG. 3

| RESOURCE | QUERY REQUIREMENT | EXPIRATION DATE (TIME) | DELETE FLAG | ACCESS PERMITTED APPLICATION TYPE |
|---|---|---|---|---|
| TELEPHONE BOOK FUNCTION | yes | t1 | no | APPLICATION A |
| CUSTOMER INFORMATION | yes | t2 | Yes | APPLICATION B |
| E-MAIL DATA | yes | t3 | no | APPLICATION A, APPLICATION C |
| CAMERA FUNCTION | yes | t4 | N/A | APPLICATION D |
| MEMORY CARD | no | t5 | Yes | APPLICATION C, APPLICATION D |

FIG. 4

| RESOURCE | VERIFICATION RULE |
|---|---|
| TELEPHONE BOOK FUNCTION | PERMIT ONLY LIMITED USER TO DELETE |
| CUSTOMER INFORMATION | PERMIT ONLY LIMITED USER TO DELETE |
| MAIL DATA | ACCESS IS PROHIBITED UNTIL PROBLEM OF MAIL FUNCTION IS RECOVERED |
| CAMERA FUNCTION | IN PROHIBITED AREA (SUCH AS MUSEUM), USAGE IS PROHIBITED |
| MEMORY CARD | ALL USERS ARE PERMITTED |

FIG. 5

| USER ID | MOBILE TERMINAL ID | AUTHENTICATION INFORMATION | ACCESS CONTROL RULE | PUSH REQUEST |
|---|---|---|---|---|
| 1 | A | K1 | A1 | no |
| 2 | B | K2 | A2 | yes |
| 3 | C,D,E,F,G | K3 | A3 | no |
| ... | ... | ... | | |
| j | J | Kj | Aj | no |

MOBILE TERMINAL, ACCESS CONTROL MANAGEMENT DEVICE, AND ACCESS CONTROL MANAGEMENT METHOD

TECHNICAL FIELD

The present invention relates to a mobile terminal, an access control management device, and an access control management method.

BACKGROUND ART

A device management technique for protecting confidential functions of a mobile terminal in a case where the mobile terminal is lost or stolen is disclosed so far. In this technique, the mobile terminal is remotely controlled to change an access control rule or delete data (refer to, for example, JP-A7-193865).

More specifically, methods for configuring a wireless mobile terminal and for ensuring security for the wireless mobile terminal are provided. In such methods, remotely-controlled data is transmitted to the lost mobile terminal from external through a communication line, and thereafter the lost wireless mobile terminal receives the transmitted data and then analyzes contents of the received remotely-controlled data, so that protection processing can be executed to prevent disadvantages of an owner of the wireless mobile terminal.

A first problem of the above-described conventional methods is caused when the following situation occurs. When a mobile terminal is out of communication service or when an unexpected user identity module is installed in a mobile terminal, a remote-control request fails to be delivered. As a result, the mobile terminal cannot be remotely controlled, and thereby a fraudulent access to confidential data or to a confidential function (hereinafter, collectively referred to as "a confidential resource") may not be prevented. The user identity module (abbreviated as UIM) is an IC card in which a telephone number of a user and information of the user's contracted mobile-service provider are recorded, such as subscriber identity module (SIM), or universal subscriber identity module (USIM). By installing the UIM in the mobile terminal, the mobile terminal can be used with the telephone number recorded in the installed card. Since the remote control request is addressed to an identifier, such as a telephone number, when another UIM is installed, though data bound with the original UIM is locked, it is impossible to delete the data bound with the original UIM or to lock the function bound with the original UIM.

In addition, a second problem is caused when there are a number of mobile terminals to be managed. In this situation, the mobile terminals have to be collectively remote-controlled when an access control rule is changed. Consequently, there is a possibility that the remote control cannot be immediately executed because of loads of a management device or a network. In such a case, there is also a threat that a fraudulent access to a mobile terminal for which the remote control is delayed cannot be prevented. A collective remote control is performed when, for example, an access control for a specific group of mobile terminals such as a place or a time zone, is collectively controlled on the network side, or when a data deletion command is transmitted to all the mobile terminals having confidential data to be deleted.

Accordingly, in light of the above problems, an object of the present invention is to provide a mobile terminal, an access control management device, and an access control management method, which enable to lock an access to a confidential resource even when the mobile terminal is out of service, and enable to prevent concentration of loads when an access control rule is changed.

DISCLOSURE OF THE INVENTION

To achieve the above-described object, a first aspect of the present invention is summarized as a mobile terminal, comprising: (a) an application execution unit configured to execute an application program; (b) an access control rule management unit configured to retain an access control rule defining whether the application program has an access authorization to a confidential resource in the mobile terminal and a determining unit; (c) an access control rule query unit configured to acquire, from an external device, the access control rule by designating at least one of an identifier of a user identity module installed in the mobile terminal and an identifier of the mobile terminal, and to retain the acquired access control rule in the access control management unit; (d) a query requirement determination unit configured to determine whether to update the access control rule when the application program makes an access to the confidential resource, and to update the access control rule; (e) an authorization management unit configured to determine whether the application program has the access authorization based on the access control rule; and (f) a confidential resource management unit configured to determine whether to permit an access request to the confidential resource by the application program, based on a result of the determination of the authorization management unit.

According to the mobile terminal of the first aspect, when an application program in the mobile terminal 200 makes an access to a confidential resource, it is determined whether to update an access control rule. When it is determined to update the access control rule, the access control rule is updated, and the updated access control rule is reflected on authorization management. Accordingly, when the mobile terminal is access-controlled and when the mobile terminal is out of service, in accordance with the updated access control rule, the access to the confidential resource is blocked, or user authentication is performed, or the confidential resource is deleted. Thereby, it is possible to protect the confidential resource even when the mobile terminal is out of service.

In addition, in the mobile terminal of the first aspect, the query requirement determination unit may be configured to add, to the access control rule, at least one of a user authentication command, a lock command, and a deletion command for deleting confidential data and to update the access control rule, when the mobile terminal is out of service for a certain period or more.

According to this mobile terminal, even when the mobile terminal is out of service, the user authentication enables to guarantee a certain level of security while allowing the access to the confidential resource. Thus, convenience of user can be secured. Or, the lock command or the deletion command to delete the confidential data enables to improve a protection of the confidential resource in a state where the mobile terminal is out of service.

In addition, in the mobile terminal of the first aspect, the query requirement determination unit may comprise a cache control unit configured to check an expiration date set in the access control rule, and to call the access control rule query unit when the expiration date has expired.

According to this mobile terminal, there is no need to make an inquiry to the access control management device every time an access to a confidential resource is made. Thereby, responsiveness can be improved. In addition, each mobile terminal makes inquiries to the access control management device when making an access to a confidential resource. Thereby it is possible to prevent a concentration of loads at the time of changing the access control rule. Consequently, it is possible to perform timely access control for a plurality of mobile terminals In addition, in the mobile terminal of the first aspect, the query requirement determination unit may be configured to update so as to release the user authentication command in the access control rule for a certain period, when a user authentication is successful in the authorization management unit.

According to this mobile terminal, when the user authentication is successful before the access, there is no need to refer to the user for a certain period when an access to the confidential resource is made. Thus, it is possible to improve to a convenience and a responsiveness of the user.

In addition, in the mobile terminal of the first aspect, the authorization management unit may comprise a log transmission unit configured to record a log of the access to the confidential resource and to transmit the log to the external device.

According to this mobile terminal, it is possible to verify the operation of access control by the access control management device. In addition, it is possible to permit the access to the confidential resource without making inquiries to the access control management device by the mobile terminal. Furthermore, even when confidential information is leaked, analyzing the log enables to follow up what piece of the information is leaked or which function is operated.

In addition, in the mobile terminal of the first aspect, the confidential resource management unit may comprise a confidential data deletion unit configured to delete confidential data, when a deletion command for deleting the confidential data is included in the access control rule acquired by the access control rule query unit, and the query requirement determination unit may be configured to add, to the access control rule, the deletion command of the confidential data and to update the access control rule, when the user authentication is unsuccessful.

According to this mobile terminal, when the mobile terminal is stolen or lost, it is possible to prevent a leakage of the confidential data. In addition, when the user authentication is unsuccessful, erasing the data enables to decrease a risk of leaking the information.

In addition, in the mobile terminal of the first aspect, the access control rule query unit may be configured to acquire, from an access control management device, the access control rule by designating the identifier of the mobile terminal, when an access to a confidential resource associated with a specific user identity module is made in a state where the specific user identity module is not installed in the mobile terminal.

According to this mobile terminal, even in a state where another user identity module (UIM) is installed in the mobile terminal, it is possible to perform a remote control such as erasing data bound with the specific UIM of the terminal.

A second aspect of the present invention is summarized as an access control management device, comprising: (a) a user management unit configured to retain user information of a mobile terminal and an access control rule to be given to the mobile terminal; (b) a user authentication unit configured to perform a user authentication; (c) an access control rule response unit configured to respond with the access control rule of the mobile terminal to an inquiry from the mobile terminal, the inquiry including a designation of at least one of an identifier of a user identity module installed in the mobile terminal and an identifier of the mobile terminal; (d) an access control request reception unit configured to receive, from a user, a registration request of the access control rule or a change request of the access control rule, the access control rule being for a mobile terminal or a plurality of mobile terminals; (e) an access control rule verification management unit configured to manage a verification rule for verifying the registration request or the change request; and (f) an access control rule verification unit configured to verify, according to the verification rule, the registration request or the change request.

According to this access control management device, the mobile terminal can make inquiries to the access control rule by the identifier of the mobile terminal, and can acquire the access control rule for the mobile terminal. Accordingly, it is possible to prevent fraudulent usage of the mobile terminal even when the user identity module is replaced. In addition, verifying whether the access control rule enables to prevent from accepting the request of the access control rule by the user, who does not have authorization to the mobile terminal, and enables to force policies of the communication operator.

In addition, in the access control management device of the second aspect, the access control request reception unit may be configured to receive the registration request or the change request, which includes an expiration date.

According to this access control management device, depending on importance of the confidential resource or the required level of security, the user can set a proper security level.

In addition, in the access control management device of the second aspect, the access control rule response unit may comprise a push transmission unit configured to push-transmit the access control rule to the mobile terminal, when a push request is included in the registration request of the access control rule or the change request of the access control rule.

According to this access control management device, it is possible to immediately perform a remote control without waiting for an inquiry from the mobile terminal 200.

In addition, in the access control management device of the second aspect, the access control rule verification unit may comprise a log verification unit configured to receive an access control log from the mobile terminal and to verify the access control log.

According to this access control management device, when a fraudulent processing, which does not follow the access control rule, is found in the log, it is possible to take following measurements. For example, such measurements include: enforcing limitation of the access control rule to be given to the mobile terminal and applying the enforced limitation; and notifying a person related to the leaked confidential information. In addition, it is possible to prevent from accepting the request of the access control rule by the user, who does not have authorization to the mobile terminal. For example, when the mobile terminal is stolen and when another user identification module is installed in the mobile terminal, it is possible to reject to give an authorization for remote control of the mobile terminal.

A third aspect of the present invention is summarized as an access control management method for limiting an access to a confidential resource in a mobile terminal by an application program, comprising: (a) determining whether to update an access control rule when the application program make the access to the confidential resource, the access control rule defining whether the application program has an access authorization to the confidential resource in the mobile terminal and a determining unit; (b) acquiring, from an external device, the access control rule by designating at least one of an identifier of a user identity module installed in the mobile terminal and an identifier of the mobile terminal, and retaining the acquired access control rule; (c) determining whether the application program has the access authorization based on the access control rule; and (d) responding to an access request based on a result of the determination.

According to the access control management method of the third aspect, whether to update the access control rule is determined, when an application program on the mobile terminal 200 makes an access to the confidential resource. When update is required, the access control rule is updated, and the updated access control rule is reflected on the authorization management. Thus, when the mobile terminal in out-of-service status is access-controlled, the confidential resource can be protected by blocking an access to the confidential resource, by performing user authentication, or by erasing the confidential resource, according to the updated access control rule, even when the mobile terminal is out of service.

BRIEF DESCRIPTION OF THE DRAWINGS

FIG. 2 is a configurational block diagram of an access control management device and a mobile terminal according to the first embodiment.

FIG. 3 is an example of an access control rule table according to the first embodiment.

FIG. 4 is an example of verification rule of the access control rule according to the first embodiment.

FIG. 5 is an example of a user information table according to the first embodiment.

BEST MODES FOR CARRYING OUT THE INVENTION

Figure 1:
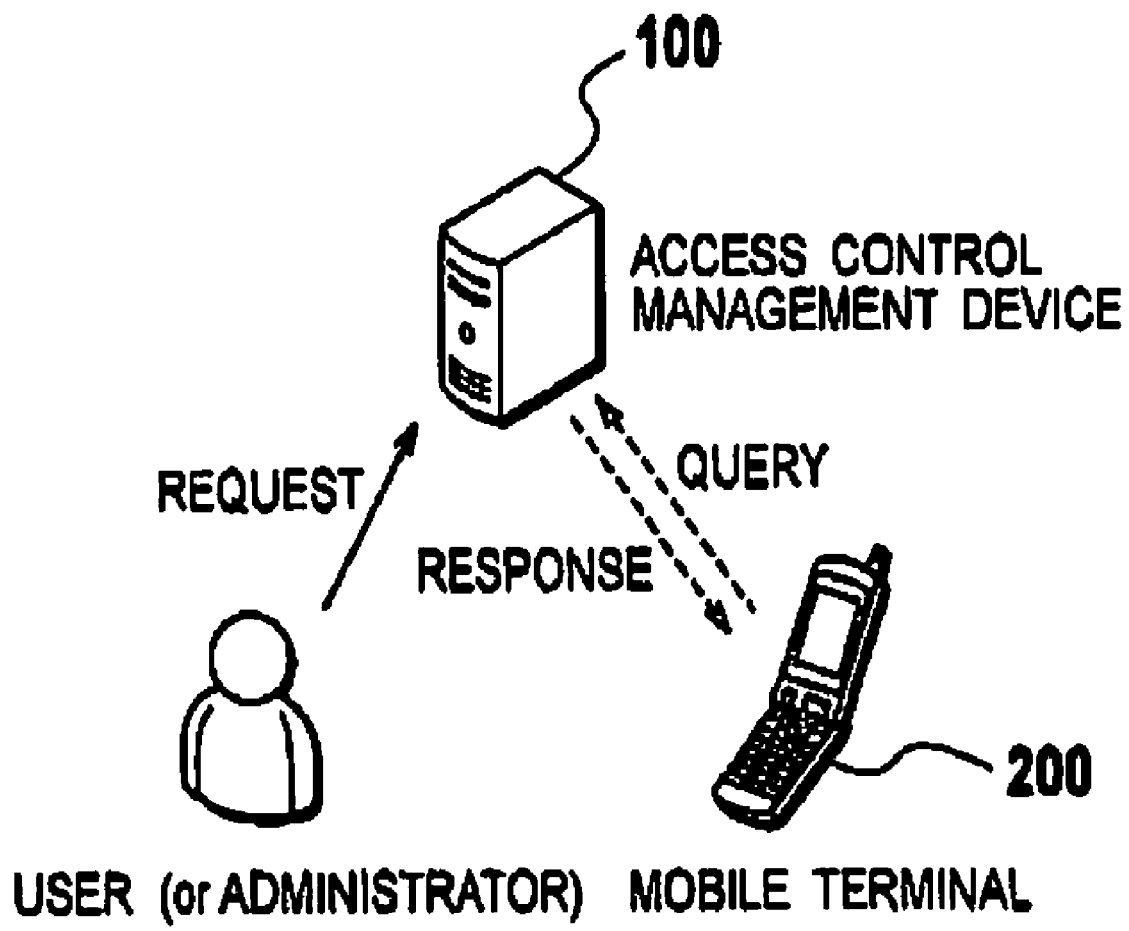
FIG. 1 is a configurational block diagram of an access control system according to a first embodiment.

Next, embodiments of the present invention will be described by referring to drawings. In the following description of the drawings, same or similar reference numerals are given to denote same or similar parts. However, it should be noted that the drawings are merely schematically shown.

First Embodiment

As shown in FIG. 1, an access control management system according to a first embodiment includes an access control management device 100 which is a server provided in a fixed-line network, and a mobile terminal 200 which is present in a radio communication network.

(Mobile Terminal)

FIG. 2 is a block diagram showing the mobile terminal 200 and the access control management device 100 according to the first embodiment. The mobile terminal 200 is, for example, a mobile telephone, a personal digital assistant (PDA), or a notebook computer, and includes an unillustrated communication interface.

The mobile terminal 200 includes an application execution unit 240, an access control rule management unit 270, an access control rule query unit 220, a query requirement determination unit 260, an authorization management unit 230, a confidential resource management unit 250, and a control unit 210. Furthermore, the query requirement determination unit 260 includes a cache control unit 261. The confidential resource management unit 250 includes a confidential data deletion unit 251. The authorization management unit 230 includes a log transmission unit 231.

The application execution unit 240 provides execution environments for executing application programs using data and functions in the mobile terminal 200. The application programs include, for example, a telephone book application, a music player application, a camera application, and a corporate application.

The access control rule management unit 270 retains an access control rule as an access control rule table. The access control rule defines whether an application program has an access authorization to a confidential resource in the mobile terminal, and a determination unit. A specific example of the access control rule table is shown in FIG. 3. A resource indicates a confidential resource. In this example, a query requirement, an expiration date, a delete flag, an access-permitted application type is associated with each resource as the access control rule. For example, the access control rule regarding the function to refer to the telephone book shows the followings: User verification, which is performed by creating a query to a user before the user makes an access to the telephone book, is necessary; The user verification is such as an input of a password, or a scan of a fingerprint; a cache is valid until t1 after updating the access control rule; data is not necessary to be deleted because the delete flag is not set; and only an application A can make the access to the telephone book. Similarly, the access control rule regarding the function to refer to customer information shows the followings: the user verification, which is performed by creating a query to a user before the user makes an access to the customer information, is necessary; a cache is valid until t2 after updating the access control rule; data is necessary to be immediately deleted because the delete flag is set; and only an application B can make the access to the customer information.

The access control rule query unit 220 acquires, from the access control management device 100 through communication unit, the access control rule by designating at least one of an identifier of a user identity module included in the mobile terminal and an identifier of the mobile terminal, and then retains the acquired access control rule in the access control rule management unit. The communication unit includes a cellular, wireless LAN, inferred ray, Bluetooth, or the like, and any type of link can be used. In addition, the access control rule may be received by push from an external device, such as the access control management device 100. As the identifier of the mobile terminal, for example, an international mobile station equipment identity (IMEI) can be used. As the identifier of the user identity module (UIM), for example, an international mobile subscriber identity (IMSI) can be used. Furthermore, when an access to a confidential resource associated with a specific user identity module is made in a state where the specific user identity module is not installed in the mobile terminal, the access control rule query unit 220 acquires the access control rule from the access control management device by designating the identifier of the mobile terminal.

The query requirement determination unit 260 determines whether to update the access control rule when an application program makes an access to the confidential resource. For example, the query requirement determination unit 260 adds, to the access control rule, at least one of a user authentication command, a lock command, and an delete command and updates the access control rule, when the mobile terminal 200 is out of service for a certain period. In the specific case shown in FIG. 3, when adding the user authentication, the query requirement determination unit 260 sets the field of the query requirement to be YES. In addition, the query requirement determination unit 260 may release the user authentication command of the access control rule for a certain period when the user authentication is successful in the authorization management unit. Furthermore, when the user authentication is unsuccessful in the authorization management unit, the query requirement determination unit 260 may add, to the access control rule, a command to delete confidential data and then update the access control rule.

The cache control unit 261 checks the expiration date set in the access control rule. Then, when the expiration date has expired, the cache control unit 261 calls the access control rule query unit. In the specific case shown in FIG. 3, the cache control unit 261 determines by referring to the field of the expiration date.

The authorization management unit 230 determines whether an application program has the access authorization by using the access control rule. For example, in the specific case shown in FIG. 3, when the application program is designated in the access-permitted application type corresponding to the confidential resource, which is an access request target, the authorization management unit 230 determines that the application program has authorization. In addition, when the field of the query requirement is set to be YES, the user authentication is executed. When a result of the user authentication is successful, then the authorization management unit 230 determines that the application program has authorization. In contrast, when the user authentication is unsuccessful, the authorization management unit 230 determines that the application program does not have authorization.

The log transmission unit 231 records a log of the access control operation determined by the authorization management unit 230 and then transmits the log to the access control management device 100. Information included in the log includes a name of the application program and an identifier of the application program, the accessed confidential resource, a time, a determination result of access control (permitted or rejected) and the like. The information may include a part of these pieces of information or may include other pieces of information.

The confidential resource management unit 250 permits or rejects an access request to the confidential resource by the application program, by using the determination result of the authorization management unit 230.

The confidential data deletion unit 251 deletes confidential data when the access control rule acquired by the access control rule query unit 220 includes a deletion command for deleting the confidential data.

The control unit 210 executes later-described procedures of access control and the like of the mobile terminal 200 by managing and controlling the above-described application execution unit 240, access control rule management unit 270, access control rule query unit 220, query requirement determination unit 260, authorization management unit 230, confidential resource management unit 250, and the like.

In addition, the mobile terminal 200 according to the first embodiment has a central processing unit (CPU). The application execution unit 240, the access control rule management unit 270, the access control rule query unit 220, the query requirement determination unit 260, the authorization management unit 230, the confidential resource management unit 250, the control unit 210, and the like are allocated, as modules, in hardware or in a separated environment. Thereby, the mobile terminal 200 can be used in a safe environment. These modules can be established by executing a designated program for using a predetermined program language in a general-purpose computer, such as a personal computer.

In addition, although it is not illustrated, the mobile terminal 200 may include a program storage unit to store programs for causing the central processing unit (CPU) to execute an application execution processing, an access control rule management processing, an access control rule query processing, a query requirement determination processing, an authorization management processing, a confidential resource management processing, a control processing, and the like. The program storage unit is a recording medium, such as a RAM, ROM, a hard disk, a flexible disk, a compact disk, an IC chip, or a cassette tape. With such recording medium, the programs can be easily stored, transported, and sold.

(Access Control Management Device)

As shown in FIG. 2, the access control management device 100 includes an access control rule verification management unit 170, a user management unit 140, a user authentication unit 150, an access control rule response unit 120, an access control request reception unit 130, an access control rule verification unit 160, and control unit 110. Furthermore, the access control rule response unit 120 includes a push transmission unit 121, and the access control rule verification unit 160 includes a log verification unit 161.

The access control rule verification management unit 170 stores a verification rule for verifying the access control rule. A specific example of the verification rule of the access control rule is shown in FIG. 4. For example, one example of the verification rule is that the delete of the telephone book function is permitted only for a user who made a special contract, because, without a back-up, the telephone book cannot be recovered again if deleted. Another example is that a mobile telephone operator prohibits the use of e-mail function and reflects the prohibition in the access control rule when the e-mail function causes a trouble and thus there is a possibility of information leakage. Furthermore, yet another example is that if a third party (e.g. museum) other than the user requires an access control rule to disable the camera function in the museum and when it is known that the user is in the museum, the access control rule is forced regardless of whether the camera function is effective or not. In addition, an access control rule for preventing reception of an access control rule requested from a user, which does not have an authorization for remotely controlling the mobile terminal, is also included.

The access control rule verification unit 160 checks the access control rule according to these verification rule and corrects the access control rule that do not fulfill the verification rule.

The log verification unit 161 receives an access control log from the mobile terminal 200 and verifies the access control log.

The user management unit 140 registers information on a user capable of changing the access control rule of the mobile terminal 200, and stores the user information on a user information table. The user is an administrator of the mobile terminal 200. For example, in the case of a mobile terminal of an individual, the owner of the mobile terminal is the administrator. In the case of a mobile terminal that is loaned to an employee by a company, a person-in-charge in a management department of the company is an administrator. FIG. 5 shows a specific example of the user information table. The user information table contains a user ID (identifier) for uniquely identifying a user, a mobile terminal ID for uniquely identifying a mobile terminal that is managed by the identified user, authorization information, an access control rule to be given to the identified mobile terminal, and a push request. For example, as the user ID, an electric mail address, an international mobile subscriber identity (IMSI), or the like is used. As the mobile terminal ID, a telephone number or a serial number (IMEI) of the terminal is used. As the authorization information, a shared key per user is used. In addition, like the user having the user ID of 3 on the table, one administrator may administrate a plurality of mobile terminals (that is, C, D, E, F, and G in FIG. 5). Moreover, an individual access control rule may be prepared for each of the plurality of mobile terminal, or same access control rule may be collectively performed for the plurality of mobile terminals.

The user authentication unit 150 verifies validity of a user requesting a registration of access control rule and a change of access control rule, and authenticates the user. For example, by using a user ID and a shared key of authentication information, it can be determined if the user is a valid user. If invalid, the user authentication unit rejects the request.

The access control rule response unit 120 responds with the access control rule of the mobile terminal to an inquiry of the access control rule from the mobile terminal 200. The access control management device 100 can find corresponding access control rule from the user information table in FIG. 4 by the inquiry in which the ID of the mobile terminal or ID of the administrator is designated.

When a push request is included in a registration request of the access control rule or a change request of the access control rule from the user, the push transmission unit 121 push-transmits the access control rule to the mobile terminal 200

The access control request reception unit 130 receives, from the user, the registration request of the access control rule or change request of the access control rule, the access control rule being for a mobile terminal or a plurality of mobile terminals.

The control unit 110 executes later-described procedures of registering or changing the access control rule by managing and controlling the above-described access control rule verification management unit 170, user management unit 140, user authentication unit 150, access control rule response unit 120, access control request reception unit 130, and access control rule verification unit 160.

In addition, the access control management device 100 according to the first embodiment has a central processing unit (CPU). The access control rule verification management unit 170, the user management unit 140, the user authentication unit 150, the access control rule response unit 120, the access control request reception unit 130, the access control rule verification unit 160, control unit 110, and the like are allocated, as modules, in hardware or a separated environment. Thereby, the access control management device 100 can be executed in a safe environment. These modules can be established by executing a designated program for using a predetermined program language in a general-purpose computer, such as a personal computer.

Moreover, although it is not illustrated, the access control management device 100 may include a program storage unit to store programs for causing the central processing unit (CPU) to execute an access control rule verification management processing, a user management processing, a user authentication processing, an access control rule response processing, an access control request reception processing, an access control rule verification processing, a control processing, and the like. The program storage unit is a recording medium, such as a RAM, a ROM, a hard disk, a flexible disk, a compact disk, an IC chip, or a cassette tape. With such recording medium, the programs can be easily stored, transported, and sold.

(Procedures of Register or Changing an Access Control Rule)

Figure 6:
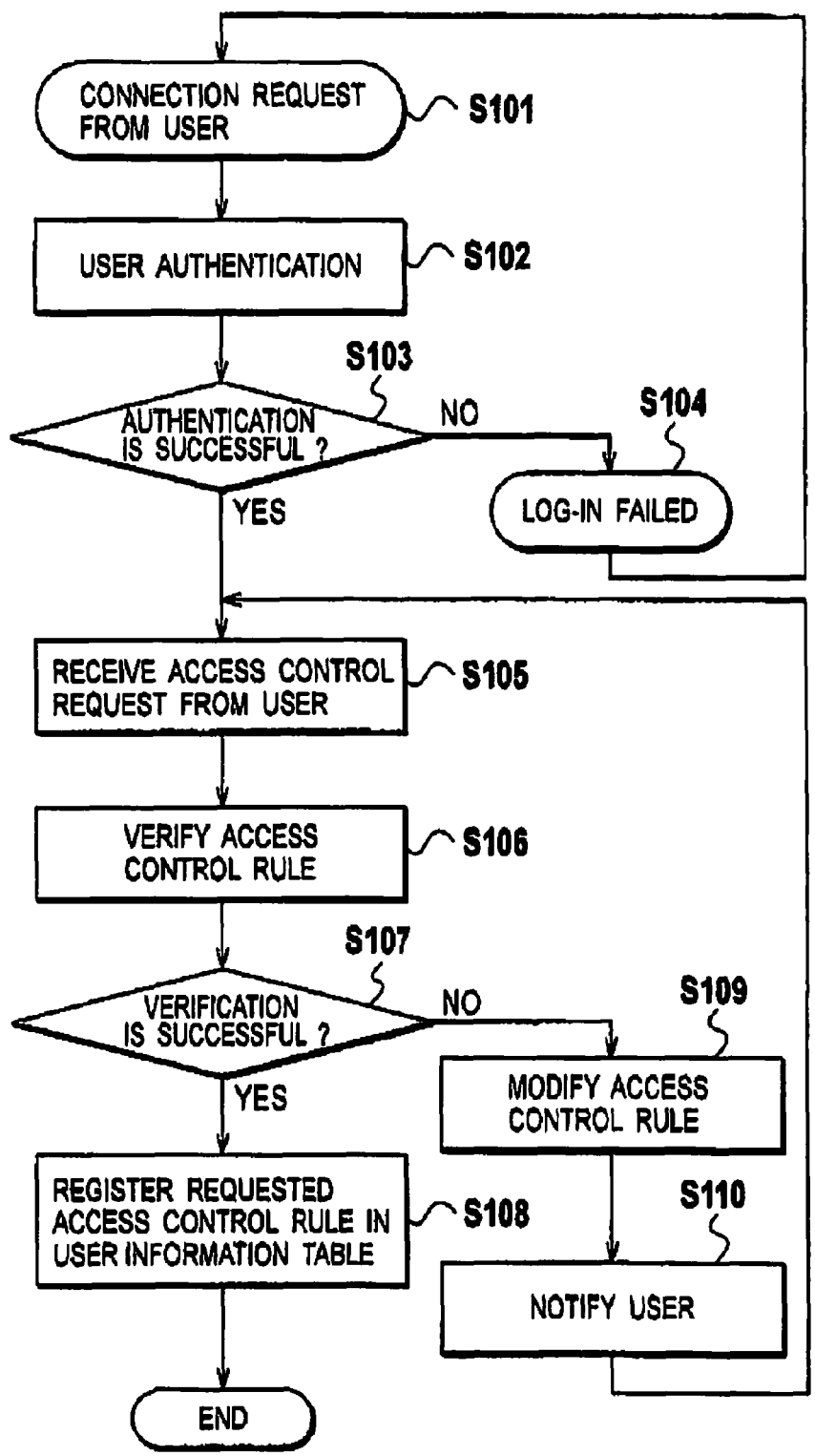
FIG. 6 is a flowchart showing procedures to register or change the access control rule in the access control management device according to the first embodiment.

Next, by referring to FIG. 6, procedures on how a user registers or changes the mobile terminal 200 in the access control management device 100 will be described. It is assumed here that the user is already registered in the access control management device 100 and that the user ID and the authentication information in the user information shown in FIG. 4 have been already set.

Firstly, at step S101, the access control management device 100 receives a connection request from the user. Then, at step S102, the user authentication unit 150 verifies whether the user is a valid user based on the user ID and the authentication information.

Subsequently, if the authentication is successful at step S103, the user completes log-in. If the authentication is unsuccessful, the step proceeds to step S104 to wait for a connection request again from the user.

Then, at step S105, the access control request reception unit 130 receives, from the user, a pair of the mobile terminal ID and the access control rule as an access control request. After that, at step S106, the access control rule verification unit 160 verifies the pair of the mobile terminal ID and the access control rule to check whether an invalid authorization is not set, in reference to the access control rule verification information managed by the access control rule verification management unit 170.

When it is determined that the invalid authorization is set at step S107, the step proceeds to step S109 and then step S110 to correct the access control rule and to give a notification to the user. The user accepts the corrected access control rule or retransmits further-corrected access control rule to the access control management unit 100.

Thereafter, at step S108, the user management unit 140 finally writes, on the user information table, a valid pair of the mobile terminal ID and the access control rule, the valid pair being verified by the access control rule verification unit 160.

In the foregoing description, the procedures that the access control request reception unit 130 receives, from the user, the pair of the mobile terminal ID and the access control rule as an access control request have been described. However, note that the access control request reception unit 130 may receive a pair of (the ID of the user identity module and the access control rule) as an access control request.

(Procedures of Access Control by Mobile Terminal)

Next, procedures of access control on a mobile terminal side will be described by referring to FIG. 7. Here, an example will be described, in which a user authentication is performed when an access to a confidential resource is made and when the mobile terminal is out of service.

Firstly, at step S201, an application program operating in the application execution unit 240 tries to make an access to a confidential resource. Then, at step S202, the authorization management unit 230 calls the query requirement determination unit 260 to determine whether to update the access control rule.

Subsequently, at step S203, when the query requirement determination unit 260 finds out that the expiration data has expired by referring to the field of the expiration date on the access control rule table, the query requirement determination unit 260 determines that update is required. Then, the step proceeds to step S204. If the current time is before the expiration date, the query requirement determination unit 260 determines that update is not required.

Then, at step S204, the access control rule query unit 220 requests, to the access control management device 100, the access control rule by designating the ID of the mobile terminal 200. The access control rule reception unit 130 of the access control management device 100 extracts, from the user management table, the access control rule corresponding to the ID of the mobile terminal. Then, the access control rule response unit 120 transmits the extracted access control rule to the mobile terminal 200. At this time, the access control request reception unit 130 may perform an authentication of the mobile terminal. Next, at step S205, the query requirement determination unit 260 determines whether the mobile terminal is out of service for a certain period or more, and the result is determined at step S206. Then, at step S207, if it is determined that the mobile terminal is out of service for a certain period or more, in order to add a user authentication command to the access control rule, the field of query requirement on the access control rule table is updated to be YES (required).

Then, at step S208, the authorization management unit 230 determines whether the application program has an authorization, by use of the access control rule. Specifically, for example, whether an application program has the authorization is checked by referring to the field of the access permitted application type on the access control rule table. After that, at step S210, if the application program has authorization, by using the determination result, the authorization management unit 230 determines whether the field of the query requirement on the access control rule table is YES (required). When the query is not required, the authorization management unit 230 determines that the application has authorization. In contrast, when the query is required, user authentication is performed at step S211. Then, when the user authentication is successful, it is determined that the application has authorization. When the user authentication is unsuccessful, it is determined that the application does not have authorization.

Thereafter, the step proceeds to step S212 when the application program has authorization, and the confidential resource management unit 250 permits the access request to the confidential resource by the application program, based on the determination result. In contrast, the step proceeds to step S213 when the application does not have authorization, and the confidential resource management unit 250 rejects the access request to the confidential resource by the application program.

Note that the query requirement determination unit 260 may also add, to the access control rule, a lock command for rejecting an access or a deletion command for deleting data in addition to a user authentication command. If the lock command is added, the authorization management unit 230 rejects the access, when it is determined whether the application has authorization by using the access control rule and even when the application type has authorization. In addition, when the authorization management unit performs user authentication at step S211 and when the user authentication is unsuccessful, the query requirement determination unit may be called to add the deletion command. Thereafter, the confidential data deletion unit may execute the deletion command.

(Access Control Procedures Using Log)

Figure 8:
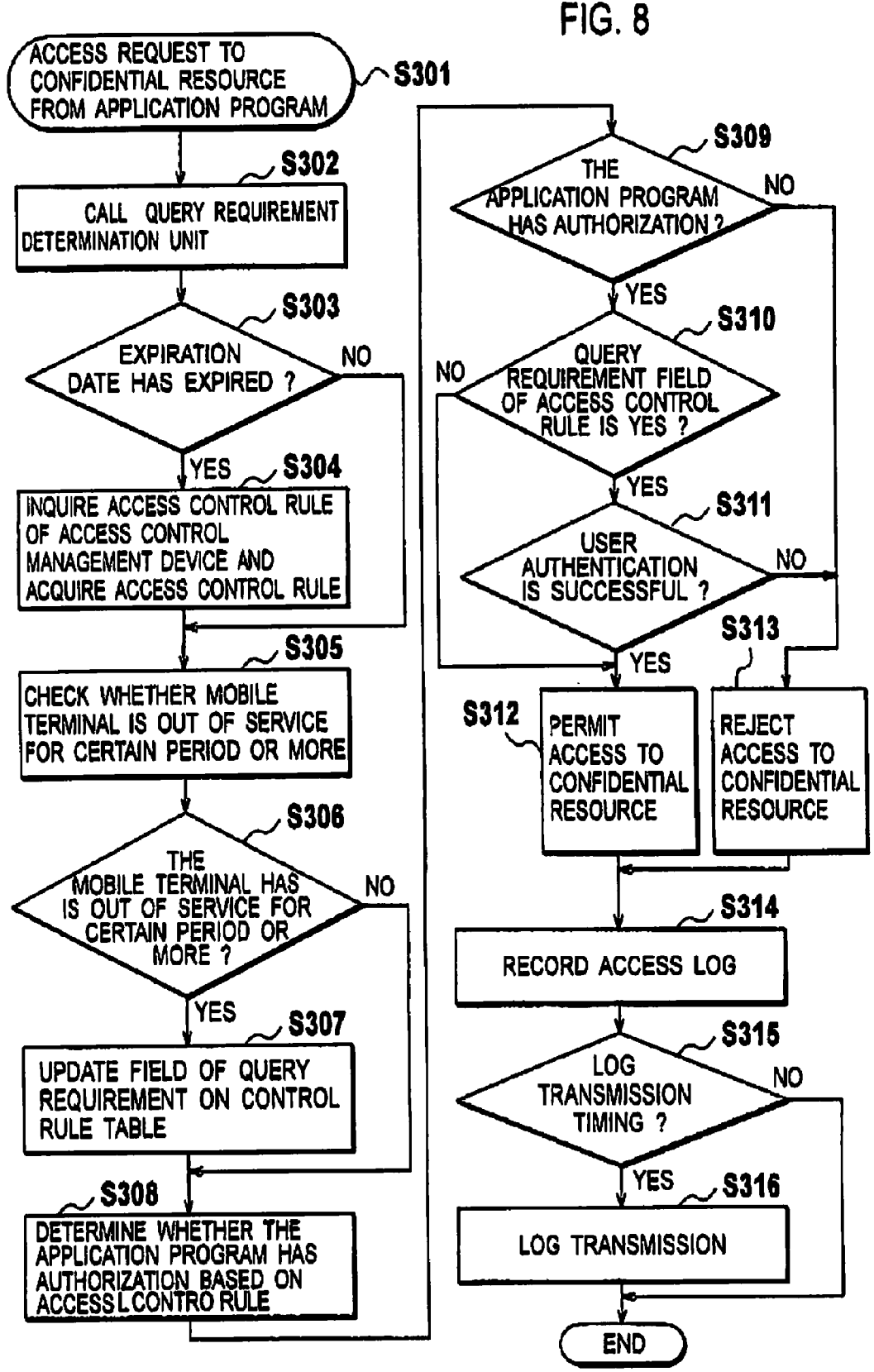
FIG. 8 is a flowchart showing procedures of access control by using a log in the mobile terminal according to the first embodiment.
Figure 9:
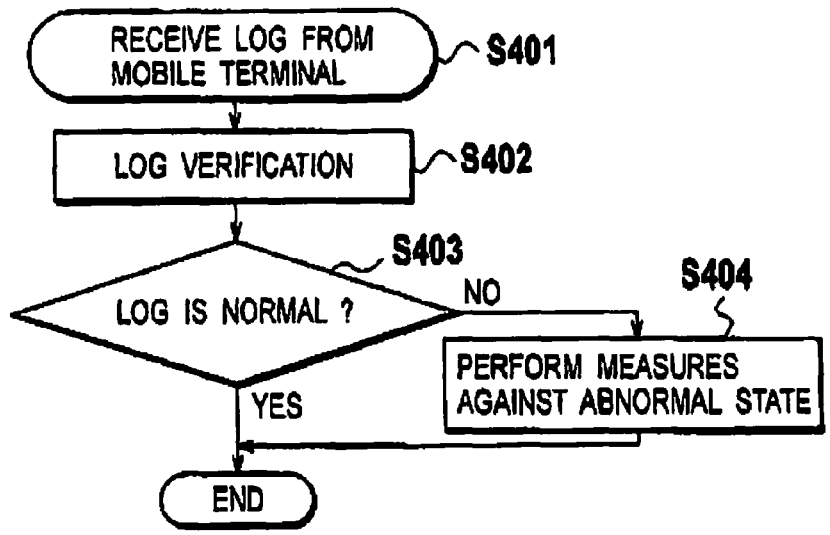
FIG. 9 is a flowchart showing procedures of access control by using a log in the access control management device according to the first embodiment.

Next, procedures of access control when an access control log is used will be described by referring to FIGS. 8 and 9. FIG. 8 shows procedures of the mobile terminal 200. FIG. 9 shows procedures of the access control management device 100.

Figure 7:
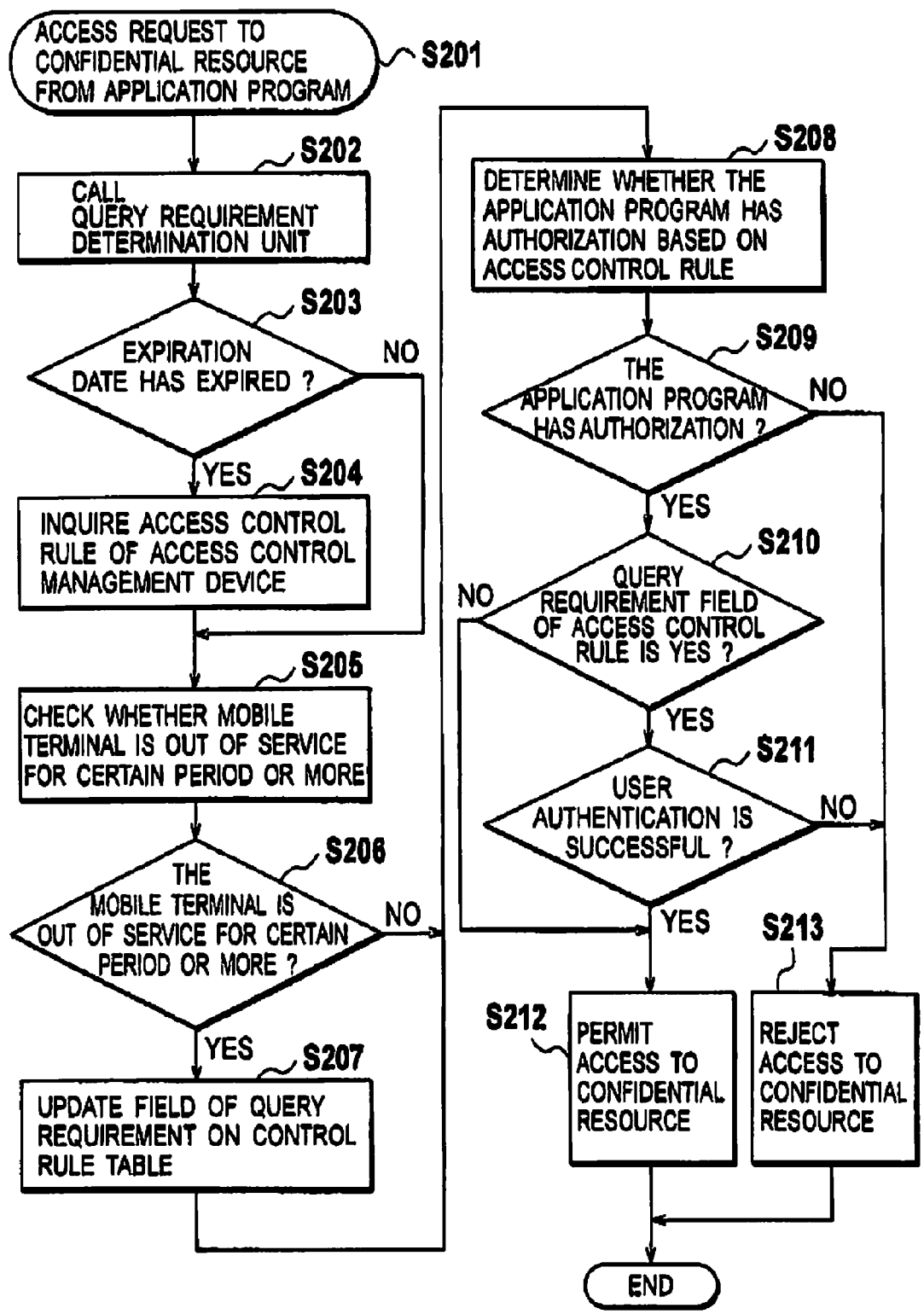
FIG. 7 is a flowchart showing procedures of access control in the mobile terminal according to the first embodiment.

Firstly, steps S301 to S313 in FIG. 8 are similar to the steps S201 to S213 in FIG. 7, and the description thereof will not be repeated here.

Next, at step S314, the authorization management unit 230 records a log of the access control operation when the access control is determined according to the access control rule held by the access control rule management unit 270.

Subsequently, at step S315, the authorization management unit 230 determines whether the log is to be transmitted now. The log is transmitting at any timing, such as a timing after a predetermined period has past, a timing after the access control is determined for a predetermined times, a timing when a communication service changes from out-of-service to in-service, or a timing when the access control management device requests the transmission of the log.

Then, at step S316, the authorization management unit 230 transmits the log to the access control management device 100.

On the other hand, at step S401 in FIG. 9, the access control request reception unit 130 of the access control management device 100 receives the log from the mobile terminal 200.

Thereafter, at step S402, the access control rule verification unit 160 of the access control management device 100 analyzes the received log, and at step S403, checks if the log of the access control of the mobile terminal 200 is normal.

When it is determined that the access control is fraudulent from the result of the log check, the step proceeds to step S404, and the access control rule response unit 120 performs a processing to the fraudulent access control. As the processing, for example, prohibiting an further access to the confidential resource, requiring user verification every time an access is made, shortening a validity period of the cache, notifying the user or the administrator, or the like are performed.

In addition, modified examples may include procedures of acquiring and transmitting a log only when the mobile terminal 200 is out of service, procedures of limiting acquisition of the log to an access to a specific function or data, and procedures of recording logs of not all access control events but with a certain frequency.

(Access Control Procedures of Mobile Terminal by Push)

Figure 10:
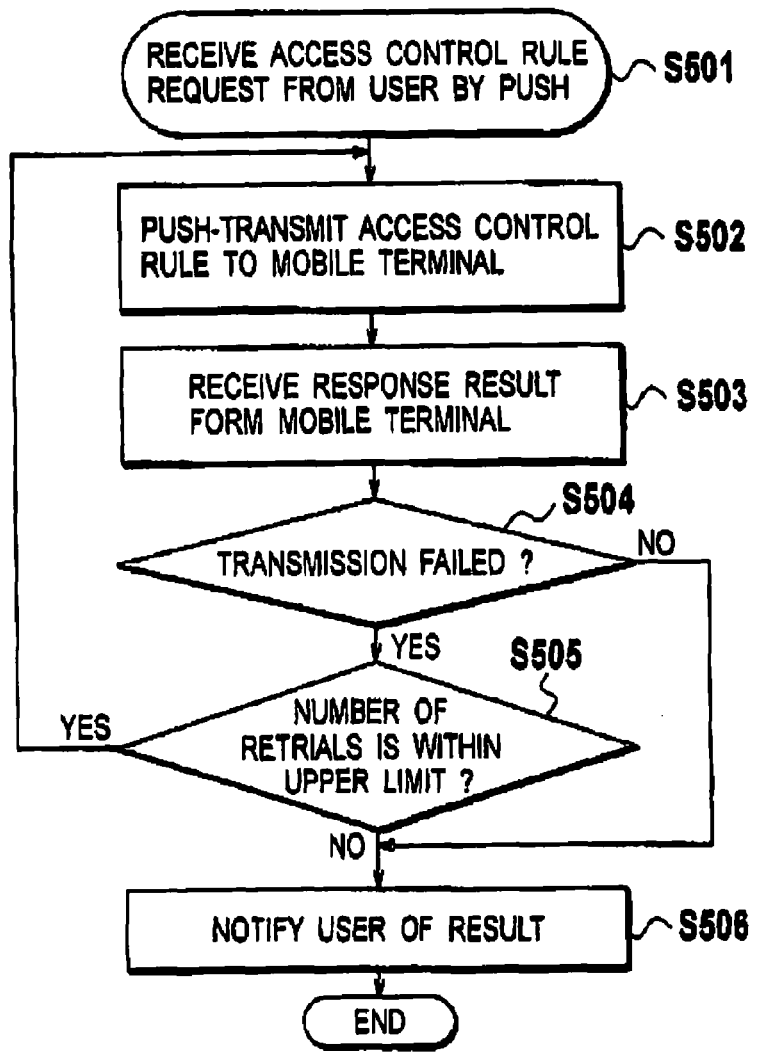
FIG. 10 is a flowchart showing procedures of access control by push in the access control management device according to the first embodiment.
Figure 11:
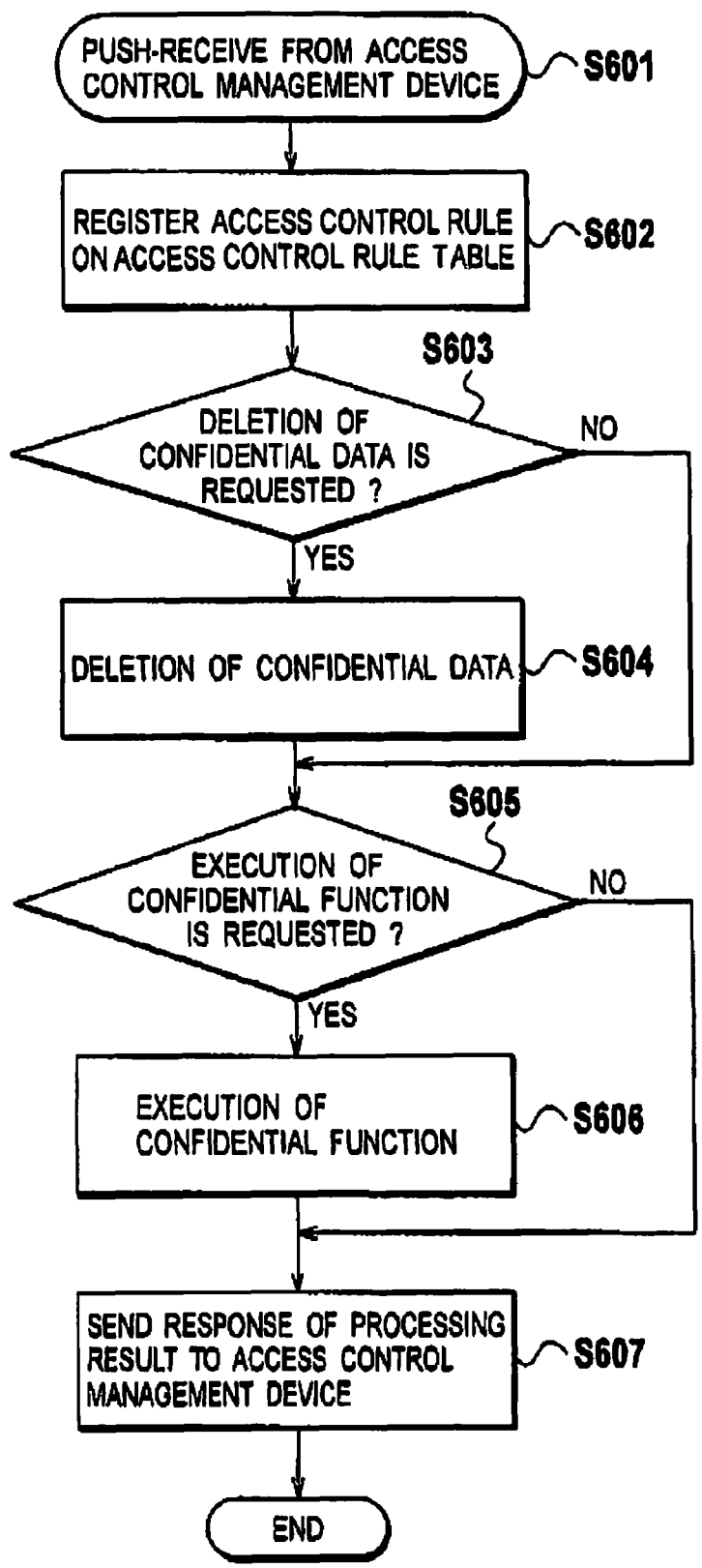
FIG. 11 is a flowchart showing procedures of access control by push in the mobile terminal according to the first embodiment.

Next, procedures of changing access control by a push communication from the access control management device will be described by referring to FIGS. 10 and 11. FIG. 10 shows procedures of the access control management device 100. FIG. 11 show procedures of the mobile terminal 200.

Firstly, at step S501 in FIG. 10, when the user designates and requests push in order to immediately reflect the access control rule on the mobile terminal 200, at step S502, the push transmission unit 121 of the access control management device 100 transmits an access control rule request to the mobile terminal 200.

Subsequently, at step S601 in FIG. 11, the access control rule query unit 220 of the mobile terminal 200 receives the access control rule. At step S602, the access control rule management unit 270 registers the received access control rule on the access control rule table. After that, at step S603, the confidential resource management unit 250 checks the access control rule. When deletion of the confidential data is requested, the step proceeds to step S604 to call the confidential data deletion unit 251 and then delete the confidential data.

Thereafter, at step S605, the application execution unit 240 determines whether an execution request of a confidential function is received. When the execution request is received, the step proceeds to step S606 to execute the confidential function.

Then, at step S607, the mobile terminal 200 transmits a response of the processing result to the access control management device 100.

Next, at step S503 in FIG. 10, the access control request reception unit 130 of the access control management device 100 receives a result of the response from the mobile terminal 200.

In addition, at step S504, when the push transmission unit 121 has failed the transmission, the step proceeds to step S505. When the number of retrials is within the upper limit, the step returns to the processing of step S502 to perform retransmission.

When the transmission is successful, or when the transmission is unsuccessful and the number of retrials exceeds the upper limit, the result is notified to the user at step S506.

Note that, although the procedures of push-transmitting the access control rule from the access control management device 100 are shown here, the access control management device 100 only push-transmits a state where the access control rule should be updated, and then the mobile terminal may refer to the access control management device based on the state.

(Access Control Procedures Based on User Identity Module of Mobile Terminal)

Figure 21:
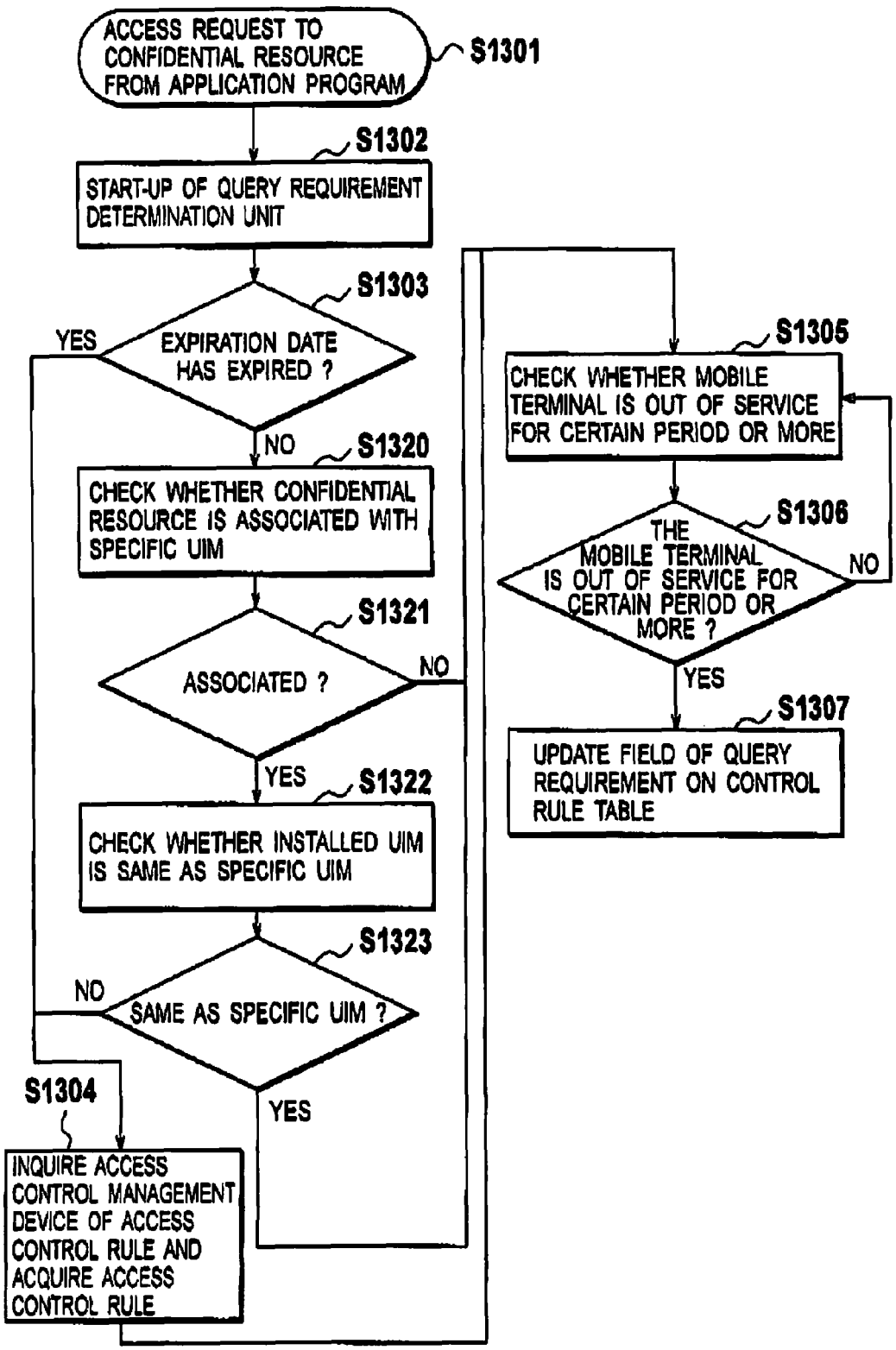
FIG. 21 is a flowchart showing procedures of access control by using a user identity module in the mobile terminal according to the first embodiment.

Next, procedures of access control based on the user identity module of the mobile terminal will be described by referring to FIG. 21.

Firstly, at step S1301, an application program operating in the application execution unit 240 tries to make an access to a confidential resource. Then, at step S1302, the authorization management unit 230 calls the query requirement determination unit 260 to determine whether to update the access control rule.

Subsequently, at step S1303, when the query requirement determination unit 260 finds out that the expiration date has expired by referring to the field of the expiration date on the access control rule table, the query requirement determination unit 260 determines that update is required. Then, the step proceeds to step S1304. When the current time is before the expiration date, the query requirement determination unit 260 determines that update is not required. After that, at step S1302, the access control rule query unit checks whether the confidential resource is associated with a specific UIM. When it is determined that the confidential resource is not associated with the specific UIM at step S1321, the step proceeds to step S1305. In contrast, when it is determined that the confidential resource is associated with the specific UIM, at step S1322, it is checked whether an installed UIM is the same UIM as the specific UIM. When it is determined to be the same, the step proceeds to step S1305. In contrast, when it is determined not to be the same, the step proceeds to step S1304.

Then, at stop S1304, the access control rule query unit 220 requests, to the access control management device 100, the access control rule by designating the ID of the mobile terminal 200. Steps following step S1305 are similar to that steps following the step S205, and the description thereof will not be repeated.

EFFECTS

According to the first embodiment, when an application program in the mobile terminal 200 makes an access to a confidential resource, it is determined whether to update an access control rule. When it is determined to update the access control rule, the access control rule is updated, and the updated access control rule is reflected on authorization management. Accordingly, when the mobile terminal 200 is access-controlled and when the mobile terminal 200 is out of service, in accordance with the updated access control rule, the access to the confidential resource is blocked, or user authentication is performed, or the confidential resource is deleted. Thereby, it is possible to protect the confidential resource even when the mobile terminal 200 is out of service.

In addition, when the mobile terminal 200 is out of service for a certain period or more, the query requirement determination unit 260 of the mobile terminal 200 according to the first embodiment adds, to the access control rule, at least one of the user authentication command, the lock command, and the deletion command for deleting the confidential data and updates the access control rule. Thereby, even when the mobile terminal is out of service, the user authentication enables to guarantee a certain level of security while allowing the access to the confidential resource. Thus, convenience of user can be secured. Or, the lock command or the deletion command to delete the confidential data enables to improve a protection of the confidential resource in a state where the mobile terminal is out of service.

In addition, the query requirement determination unit 260 of the mobile terminal 200 according to the first embodiment includes the cache control unit 261 checks the expiration date set in the access control rule and to call the access control rule query unit when the expiration date has expired. In this manner, the cache control unit 261 checks the expiration date set in the access control rule when an inquiry is made. When the expiration date has expired, the cache control unit 261 abandons the cached access control rule and makes an inquiry to acquire latest access control rule. Accordingly, there is no need to make an inquiry to the access control management device every time an access to a confidential resource is made. Thereby, responsiveness can be improved. In addition, each mobile terminal makes inquiries to the access control management device when making an access to a confidential resource. Thereby it is possible to prevent a concentration of loads at the time of changing the access control rule. Consequently, it is possible to perform timely access control for a plurality of mobile terminals.

Moreover, the query requirement determination unit 260 of the mobile terminal 200 according to the first embodiment may perform update so as to release the user authentication of the access control rule for a certain period when the user authentication is successful in the authorization management unit. When the user authentication is successful before the access, there is no need to refer to the user for a certain period when an access to the confidential resource is made. Thus, it is possible to improve to a convenience and a responsiveness of the user.

Moreover, the authorization management unit 230 of the mobile terminal 200 according to the first embodiment includes the log transmission unit 231 records a log of the access to the confidential resource and to transmit the log to an external device. Therefore, it is possible to verify the operation of access control by the access control management device. In addition, it is possible to permit the access to the confidential resource without making inquiries to the access control management device by the mobile terminal. Furthermore, even when confidential information is leaked, analyzing the log enables to follow up what piece of the information is leaked or which function is operated.

Moreover, the confidential resource management unit 250 of the mobile terminal 200 according to the first embodiment includes the confidential data deletion unit 21 deletes the confidential data when the access control rule acquired by the access control rule query unit 220 or updated by the query requirement determination unit 260 include a deletion command to delete the confidential data. Furthermore, the query requirement determination unit 260 may add, to the access control rule, the deletion command and to update the access control rule, when the user authentication is unsuccessful in the authorization management unit. Thus, when the mobile terminal is stolen or lost, it is possible to prevent a leakage of the confidential data. In addition, when the user authentication is unsuccessful, erasing the data enables to decrease a risk of leaking the information.

In addition, the access control rule query unit 220 of the mobile terminal 200 according to the first embodiment acquires, from the access control management device, the access control rule by designating an identifier of the mobile terminal when an access to the confidential resource associated with a specific user identity module is made in a state where the specific user identity module is not installed in the mobile terminal. Thus, even in a state where another user identity module (UIM) is installed in the mobile terminal, it is possible to perform a remote control such as erasing data bound with the specific UIM of the terminal.

The access control management device 100 according to the first embodiment includes a unit which retains user information regarding an administrator of a mobile terminal and information of access control rule of each mobile terminal, for each mobile terminal or a group of mobile terminals, and verifies, based on policies, a change request of the access control rule from the authenticated user so as to register the change request, and responds to an inquiry of the access control rule from the mobile terminal. Thus, the mobile terminal can make inquiries to the access control rule by the identifier of the mobile terminal, and can acquire the access control rule for the mobile terminal. Accordingly, it is possible to prevent fraudulent usage of the mobile terminal even when the user identity module is replaced. In addition, verification of the access control rule enables to prevent from accepting the request of the access control rule by the user, who does not have authorization to the mobile terminal, and enables to force policies of the communication operator.

In addition, the access control request reception unit 130 of the access control management device 100 according to the first embodiment receives the registration request or the change request, which includes the expiration date. Thus, depending on importance of the confidential resource or the required level of security, the user can set a proper security level.

Moreover, the access control rule response unit 120 of the access control management device 100 according to the first embodiment includes the push transmission unit 121, which push-transmits the access control rule to the mobile terminal 200 when a push request is included in the registration request of the access control rule or the change request of the access control rule from the user. Thus, it is possible to immediately perform a remote control without waiting for an inquiry from the mobile terminal 200.

Moreover, the access control rule verification unit 160 of the access control management device 100 according to the first embodiment includes the log verification unit 161, which receives and verifies an access control log from the mobile terminal 200. Thus, when a fraudulent processing, which does not follow the access control rule, is found in the log, it is possible to take following measurements. For example, such measurements include: enforcing limitation of the access control rule to be given to the mobile terminal and applying the enforced limitation; and notifying a person related to the leaked confidential information.

Moreover, the access control management method according to the first embodiment determines whether to update the access control rule when an application program on the mobile terminal 200 makes an access to the confidential resource. When update is required, the access control rule is updated, and the updated access control rule is reflected on the authorization management. Thus, when the mobile terminal in out-of-service status is access-controlled, the confidential resource can be protected by blocking an access to the confidential resource, by performing user authentication, or by erasing the confidential resource, according to the updated access control rule, even when the mobile terminal is out of service.

SECOND EMBODIMENT

Figure 12:
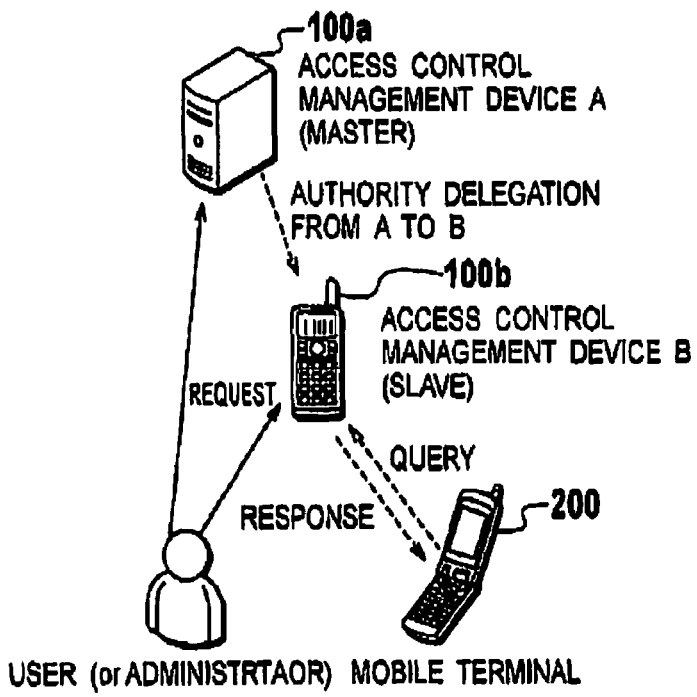
FIG. 12 is a configurational block diagram of an access control system according to a second embodiment.

Next, as a second embodiment, as shown in FIG. 12, the case where authorization of a certain access control management device A 100a is delegated to an access control management device B 100b will be described. This corresponds to, for example, a case where authorization of access control management is delegated from the access control management device A 100a, which is managed by an information system department of a company, to an access control management device B 100b, which is installed in a mobile device held by an executive of the company, so as to manage access control of a mobile terminal held by general staff of the company.

In the first embodiment shown in FIG. 1, it is assumed that the access control management device 100 is a server on a fixed-line. Thus, when the mobile terminal 200 is out of communication service and thereby cannot refer to the access control rule, there is a case where an application program cannot acquire the latest access control rule. In the second embodiment, like the mobile terminal, the access control management device B 100b is installed in a mobile device, such as a mobile telephone, a PDA, or a note PC. The mobile terminal and the access control management device communicates directly or by using multi-hop communication through a short-range wireless communication, such as a wireless LAN, a Bluetooth, an IrDA, a Zigbee, or a UWB, or through a cable communication, such as Ethernet (registered trademark).

The configuration of the mobile terminal 200 is similar to that of the first embodiment, and the description will not be repeated here.

Figure 13:
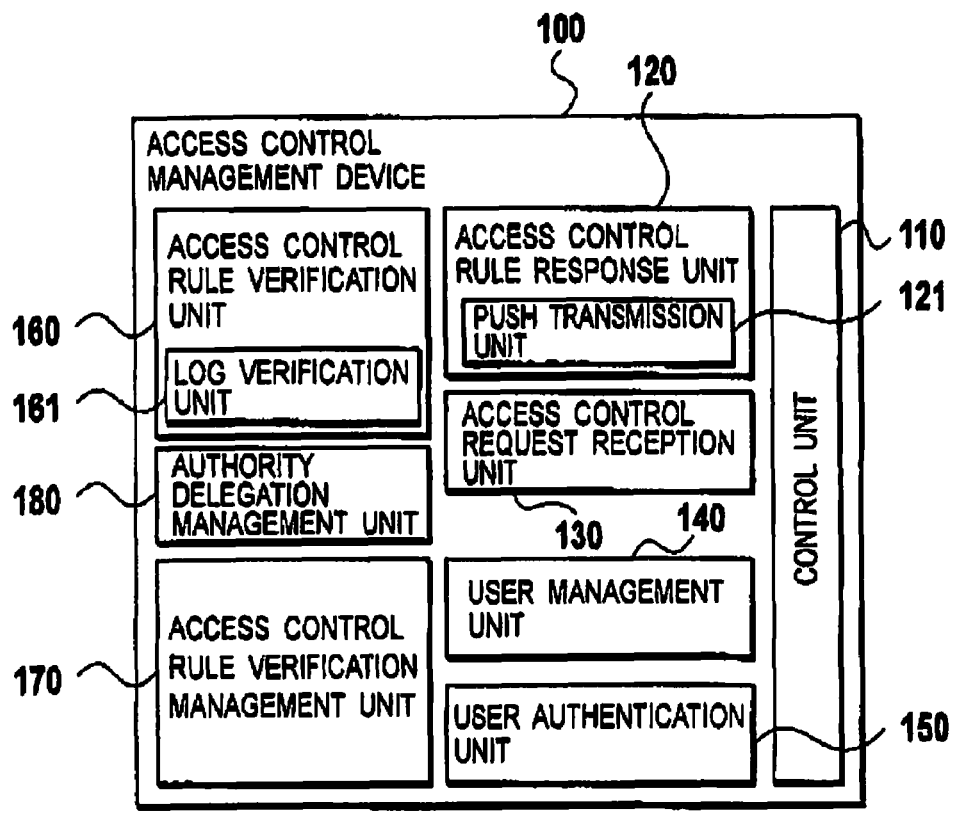
FIG. 13 is a configurational block diagram of an access control management device according to the second embodiment.

As shown in FIG. 13, the access control management devices A and B include an authority delegation management unit 180 in addition to the access control management device according to the first embodiment.

The authority delegation management unit 180 issues authority delegation, which gives authorization of access control. In addition, the authority delegation management unit 180 determines whether the authority delegation is permitted.

Since procedures of registering or changing access control rule and procedures of access control of the mobile terminal are similar to those of the first embodiment, the description thereof will not be repeated. Different procedures are ones of delegating authority from the access control management device A to the access control management device B and ones of the mobile terminal to change a query-target device from the access control management device A to the access control management device B.

(Procedures of Authority Delegation and Change of Query-Target Device)

Figure 14:
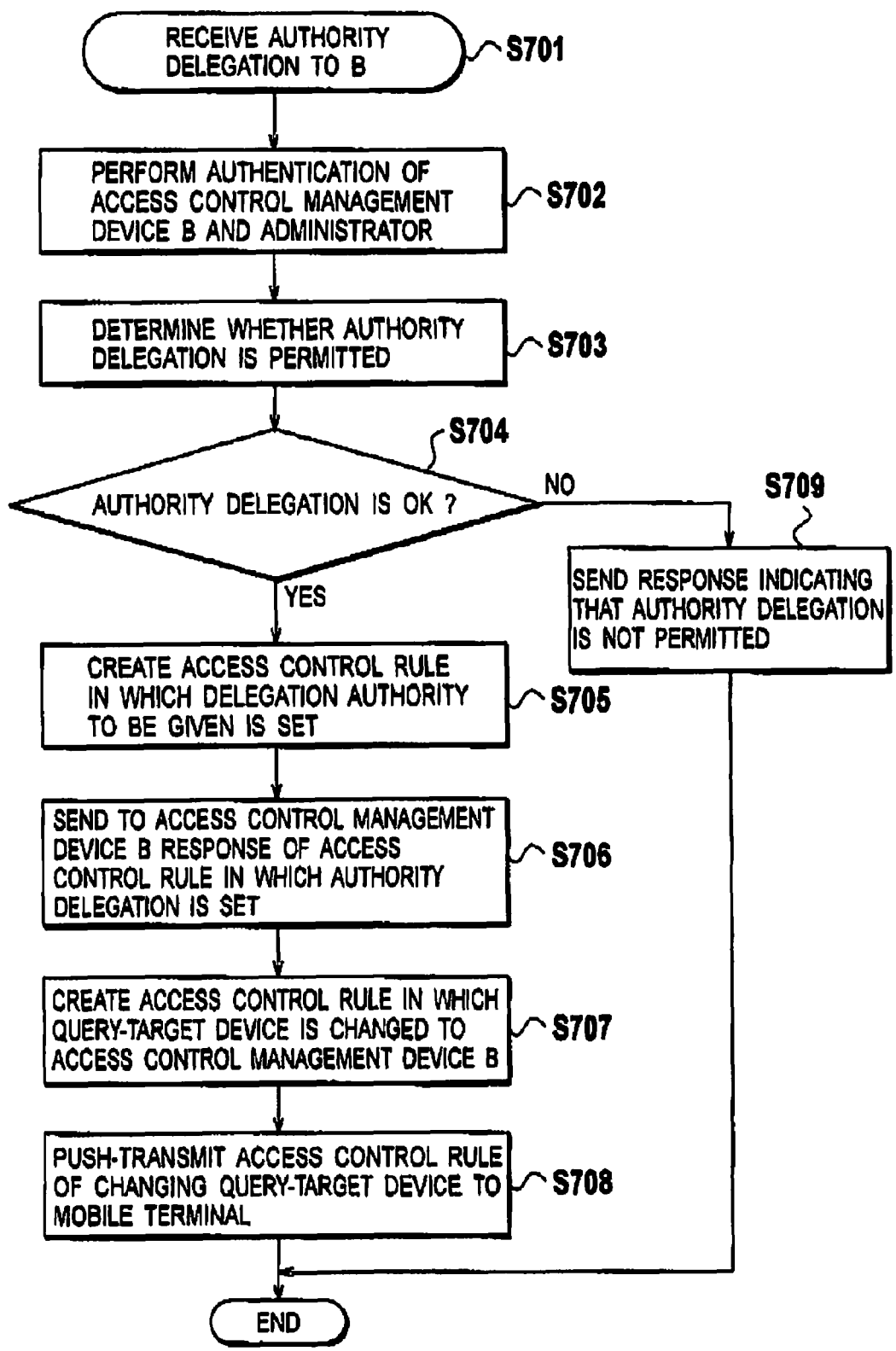
FIG. 14 is a flowchart showing procedures of authority delegation and query-target device change in the access control management device A according to the second embodiment.
Figure 15:
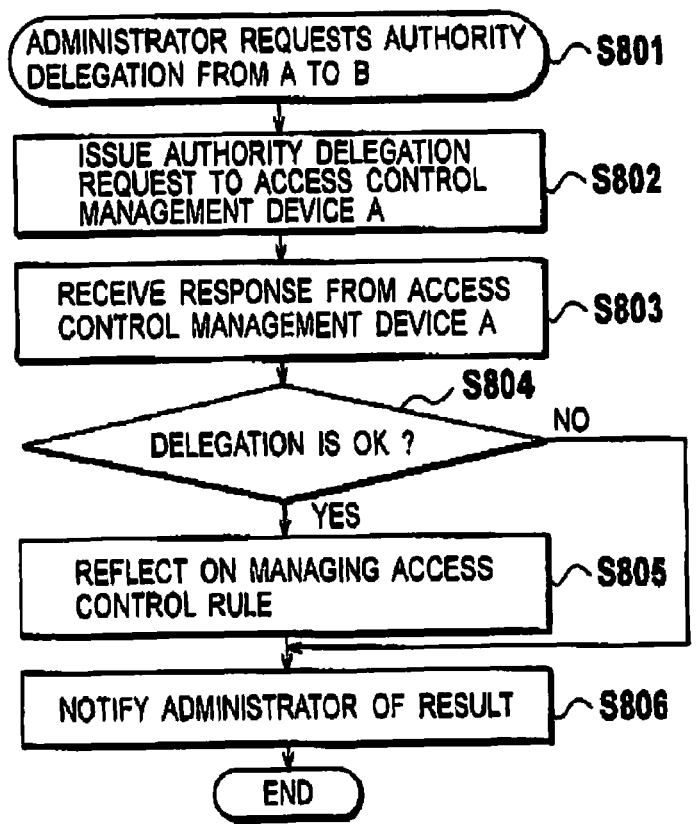
FIG. 15 is a flowchart showing procedures of authority delegation and query-target device change in the access control management device B according to the second embodiment.

Next, procedures of authority delegation performed between the access control management devices and procedures of the mobile terminal to change a referred access control management device will be described by referring to FIGS. 14 and 15. As shown in FIG. 12, it is assumed that authority is delegated from the access control management device A 100a to the access control management device B 100b. FIG. 14 shows procedures of the access control management device A 100a. FIG. 15 shows procedures of the access control management device B 100b.

Firstly, at step S801 in FIG. 15, a user (administrator) requests the access control management device A 100a to give authorization of access control to the access control management device B 100b of the mobile device. Then, at step S802, the authority delegation management unit 180 of the access control management device B issues an authority delegation request to the authority delegation management unit 180 of the access control management device A 100a.

Subsequently, at step S701 in FIG. 14, the access control request reception unit 130 of the access control management device A 100a receives the authority delegation to the access control management device B 100b. Then, at step S702, the user authentication unit 150 of the access control management device A 100a authenticates the access control management device B 100b and the administrator. After that, at step S703, the authority delegation management unit 180 determines whether the authority delegation is permitted.

Next, at step S704, when the authority delegation is permitted, the step proceeds to step S705, and an access control rule, which is delegated to the access control management device B 100b, is created. Then, at step S706, the access control rule, in which the authority delegation is set, is sent to the access control management device B 100b as a response.

In contrast, when the authority delegation is not permitted at step S704, the step proceeds to step S709, and a response showing the failure of the authority delegation is sent.

Next, at step S803 in FIG. 15, the authority delegation management unit 180 of the access control management device B 100b receives the response from the access control management device A 100a. After that, at step S804, when the delegation is permitted, the step proceeds to step S805, and the access control management device B 100b reflects the response on the managing access control rule. Then, at step S806, the access control management device B 100b notifies the user (administrator) of the result.

In addition, at step S707 in FIG. 14, the access control management device A 100a creates an access control rule in which a query-target device is changed to the access control management device B 100b.

Moreover, at step S708, the push transmission unit 121 of the access control management device A 100a delivers, to the mobile terminal by push, the created access control rule instructing the mobile terminal to refer to the access control management device B instead of the access control management device A.

The mobile terminal refers to the access control management device B for the access control after receiving the instruction. When the access control management device A instructs change of query, or the access control management device B requests termination of delegation, the mobile terminal refers to the access control management device A as originally set.

Modifications include procedures of starting, by push, delegation of authority from the access control management device A to the access control management device B, and procedures of delegating authority from the access control management device A with a time limitation.

EFFECTS

In the first embodiment, when a mobile terminal in out-of-service status makes an access to a confidential resource, there is a case where the access control management device cannot be referred and thus the latest access control rule cannot be acquired. In contrast, with the access control management device according to the second embodiment, the mobile terminal can refer to the access control management device through a short-range wireless or a close-range communication and can acquire the updated access control rule even when the mobile terminal is out of service. Accordingly, protection of confidential resource and convenience of the user can be improved. In addition, loads of the access control management device is deconcentrated, and thereby responsiveness can be improved.

THIRD EMBODIMENT

Figure 16:
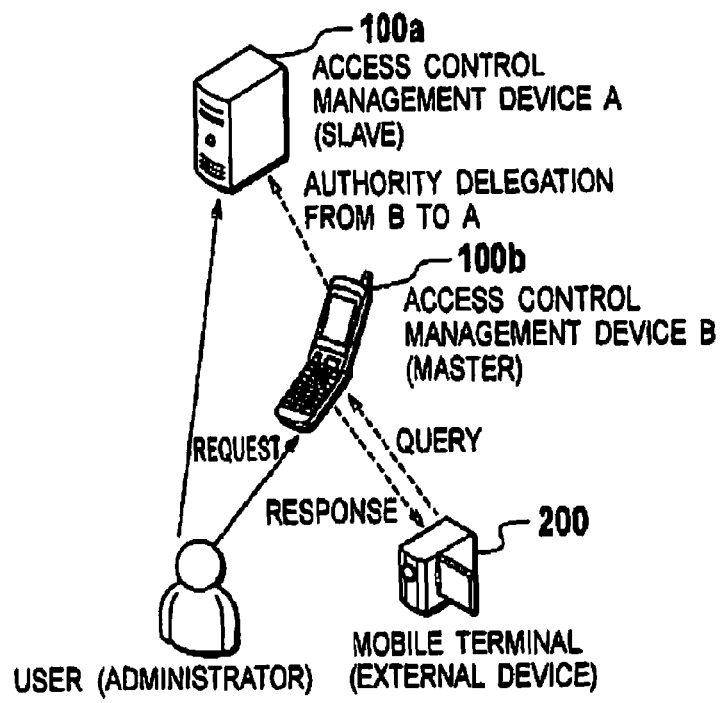
FIG. 16 is a configurational block diagram of an access control system according to a third embodiment.

Next, as a third embodiment, as shown in FIG. 16, the case where an access control management device B 100b delegates, to an access control management device A 100a in advance, management authorization for a case where the access control management device B 100b is lost. For example, this corresponds to a case in which, in a normal time, a mobile device manages an external device (mobile terminal 200) as an access control management device B 100b, and when the mobile device is lost, a server (access control management device A 100a) controls authorities of the mobile terminal (access control management device B 100b) and the external device (the mobile terminal 200).

The configurations of the mobile terminal 200 and access control management devices A 100a and B 100b are similar to those of the second embodiment, and the description thereof will not be repeated here.

Procedures of registering or changing access control rule and procedures of access control of the mobile terminal are similar to those of the first embodiment, and description thereof will not be repeated here. Different procedures are ones of delegating authority from the access control management device B 100b to the access control management device A 100a and ones of pushing the access control rule from the access control management device A 100a to the access control management device B 100b.

(Procedures of Authority Delegation)

Figure 17:
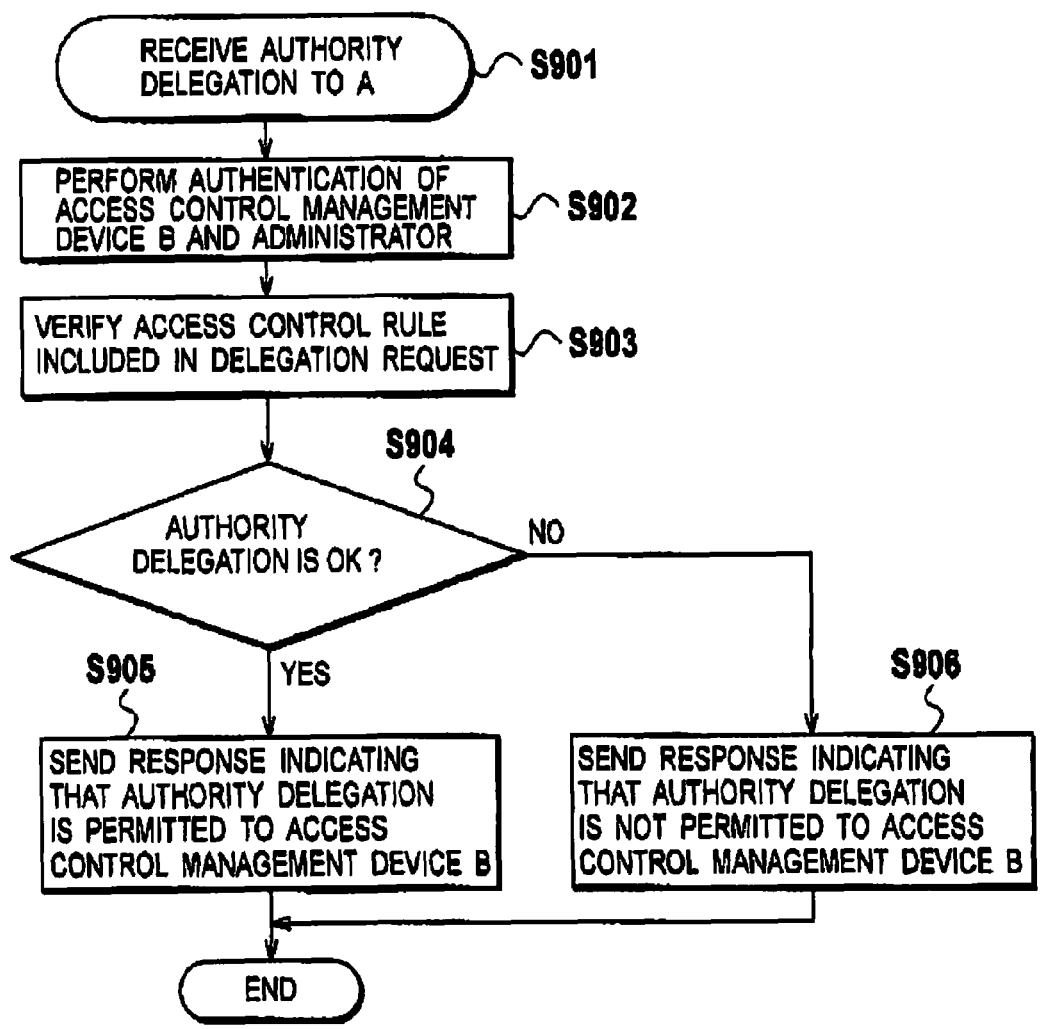
FIG. 17 is a flowchart showing procedures of authority delegation in the access control management device A according to the third embodiment.
Figure 18:
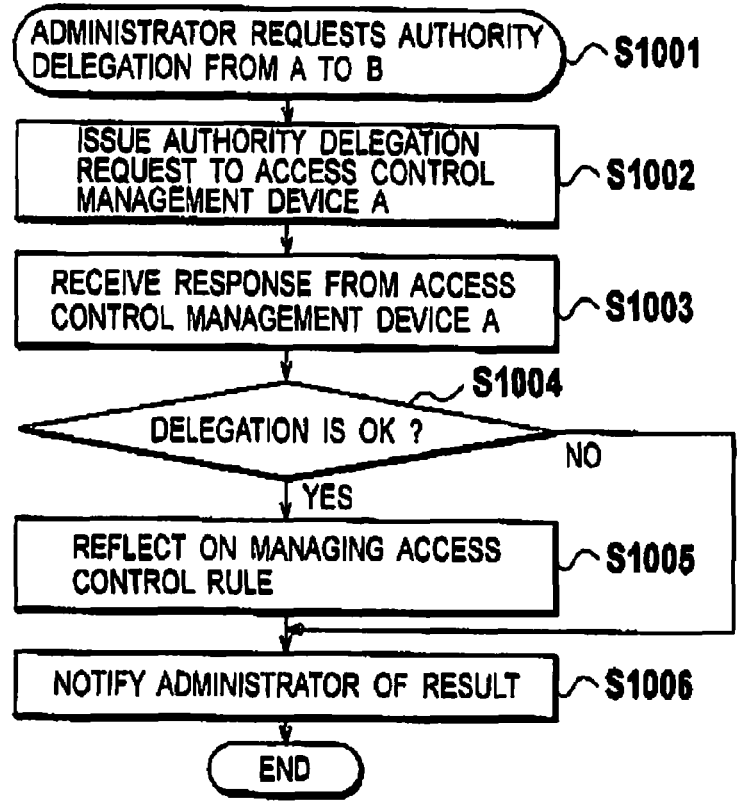
FIG. 18 is a flowchart showing procedures to authority delegation in the access control management device B according to the third embodiment.

Next, procedures of delegating authority from the access control management device B 100b to the access control management device A 100a will be described by referring to FIGS. 17 and 18. Here, as shown in FIG. 16, it is assumed that management authority for a case where a mobile device is lost is delegated in advance to the access control management device A 100a. FIG. 17 shows procedures of the access control management device A 100a. FIG. 18 shows procedures of the access control management device B 100b.

Firstly, at step S1001 in FIG. 18, when an administrator requests authority delegation from the access control management device B 100b to the access control management device A 100a, at step S1002, the authority delegation management unit 180 of the access control management device B 100b issues, to the access control management device A, a delegation request including an access control rule defining management authority for the case where the mobile device is lost.

Next at step S901 in FIG. 17, the access control request reception unit 130 of the access control management device A receives the delegation request. Thereafter, at step S902, the user authentication unit 150 performs authentication of the access control management device B 100b and the administrator. Next, at step S903, the access control rule verification unit 160 verifies the access control rule included in the delegation request.

Then, at step S904, when the authority delegation is permitted, the user management unit 140 retains the access control rule included in the delegation request, and the step proceeds to step S905. At step S905, the access control rule response unit 120 sends, to the access control management device B 100b, a response indicating that the authority delegation is permitted. In contrast, when the authority delegation is not permitted at step S904, the step proceeds to step S906. At step S906, the access control rule response unit 120 sends, to the access control management device B 100b, a response indicating that the authority delegation is not permitted.

On the other hand, at stop S1003 in FIG. 18, the access control management device B 100b receives the response from the access control management device A 100a. Then, when the authority delegation has permitted at step S1004, the step proceeds to step S1005 to reflect the response on the managing access control rule. Thereafter, at step S1006, the access control management device B 100b notifies the administrator of the result.

(Procedures of Controlling Access Control Management Device by Push)

Figure 19:
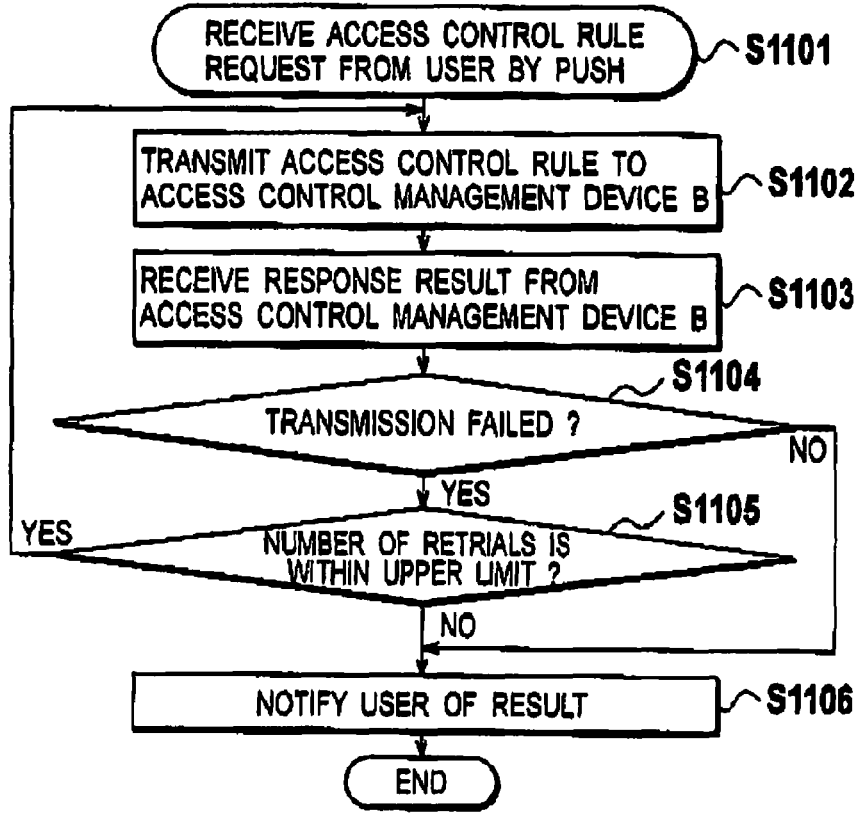
FIG. 19 is a flowchart showing procedures of access control by push in the access control management device A according to the third embodiment.
Figure 20:
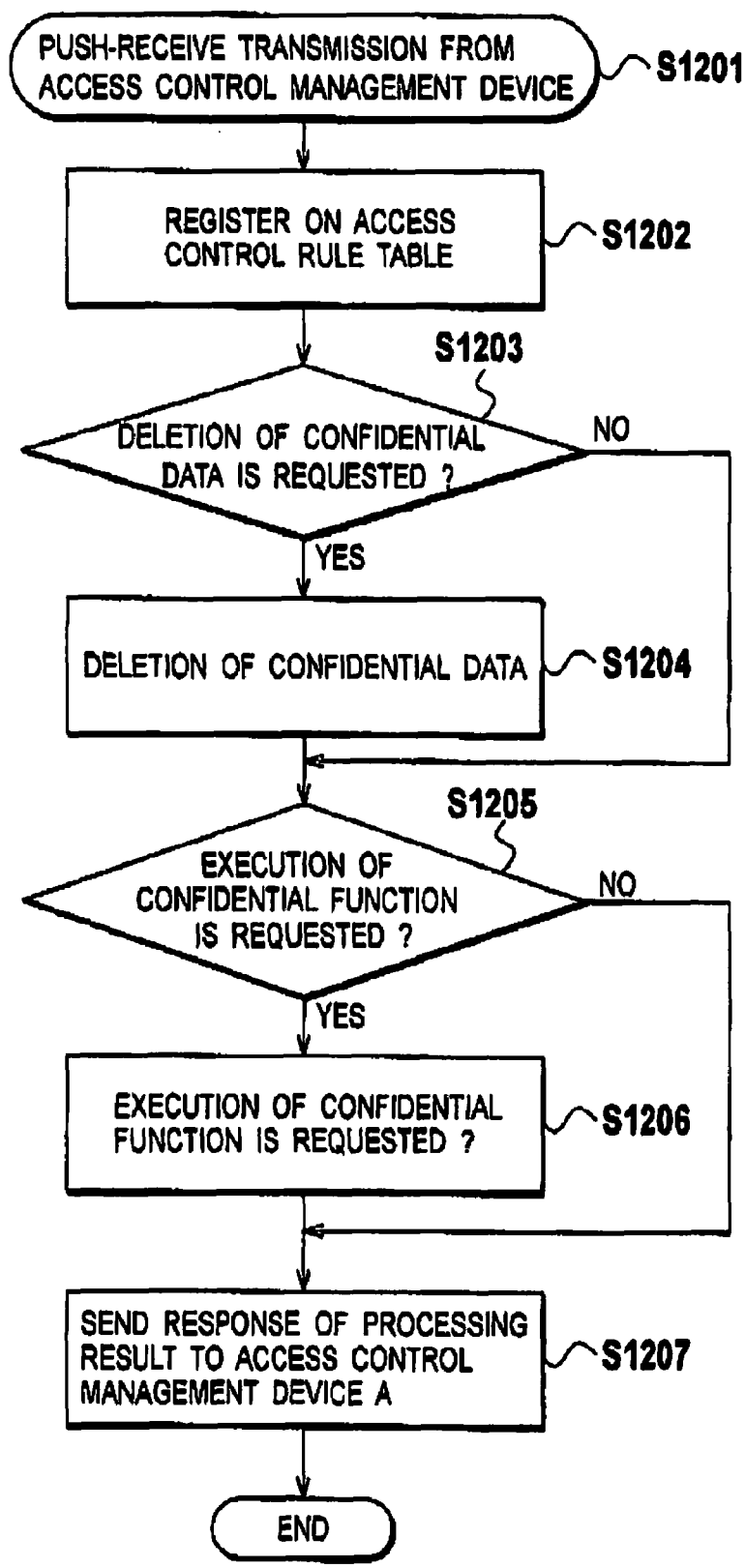
FIG. 20 is a flowchart showing procedures of access control by push in the access control management device B according to the third embodiment.

Next, procedures of pushing access control rule from the access control management device A 100a to the access control management device B 100b will be described by referring to FIGS. 19 and 20. FIG. 19 shows procedures of the access control management device A 100a. FIG. 20 shows procedures of the access control management device B 100b.

Firstly, at step S1101 in FIG. 19, in a case where a mobile device is lost, the user (administrator) of the mobile terminal requests the access control management device A 100a to change the access control rule (such as to lock the functions or to delete confidential data). The access control request reception unit 130 of the access control management device A 100a receives the change request of the access control rule. Then, the user authentication unit 150 performs user authentication, and the access control rule verification unit 160 verifies the access control rule. When any one of these is unsuccessful, the access control rule response unit 120 responds with a response indicating failure to the user.

Next, at step S1102, the push transmission unit 121 push-transmits the access control rule to the access control management device B 100b.

Then, at step S1201 in FIG. 20, the access control request reception unit 130 of the access control management device B 100b receives the access control rule. Then, the access control rule verification unit 160 performs authentication of the access control management device A 100a and verification of the access control rule. When these are successful, at step S1202, the access control rule is registered in the user management unit 140 as the access control rule table. These access control rules are reflected on the access control of the mobile terminal.

Processes at steps S1203 to S1207 are similar to those at the steps S603 to S607 in FIG. 11, and the description thereof will not be repeated.

In addition, processes at steps S1103 to S1106 are similar to those at the steps S503 to S506 in FIG. 10, and the description thereof will not be repeated.

EFFECTS

With the access control management device according to the third embodiment, the user can freely manage access control of an external device through a mobile device in a normal situation. In addition, when the mobile device is lost, the user can manage the mobile device through a server, and thereby can also manage the external device. Consequently, the confidential resources in the external device can be securely protected.

FIELD OF THE INDUSTRIAL APPLICATION

As described above, the mobile terminal, the access control management device, and the access control method according to the present invention are useful in the art which enable to lock an access to a confidential resource even when the mobile terminal is out of service, and enable to prevent concentration of loads when an access control rule is changed.

The invention claimed is:

1. A mobile terminal, comprising:
an application execution unit configured to execute an application program;
an access control rule management unit configured to retain an access control rule defining whether the application program has an access authorization to a confidential resource in the mobile terminal and a determining unit;
an access control rule query unit configured to acquire, from an external device, the access control rule by designating at least one of an identifier of a user identity module installed in the mobile terminal and an identifier of the mobile terminal, and to retain the acquired access control rule in the access control management unit;
a query requirement determination unit configured to determine whether to update the access control rule when the application program accesses to the confidential resource, and to update the access control rule;
an authorization management unit configured to determine whether the application program has the access authorization based on the access control rule; and
a confidential resource management unit configured to determine whether to permit an access request to the confidential resource by the application program, based on a result of the determination of the authorization management unit; wherein
the query requirement determination unit is configured to add, to the access control rule, at least one of a user authentication command, a lock command, and a deletion command for deleting confidential data and to update the access control rule when the mobile terminal is out of service for a certain period or more.

2. The mobile terminal according to claim 1, wherein the query requirement determination unit comprises
a cache control unit configured to check an expiration date set in the access control rule, and to call the access control rule query unit when the expiration date has expired.

3. The mobile terminal according to claim 2, wherein the query requirement determination unit is configured to update so as to release the user authentication command in the access control rule for a certain period, when a user authentication is successful in the authorization management unit.

4. The mobile terminal according to claim 1, wherein the authorization management unit comprises
a log transmission unit configured to record a log of the access to the confidential resource and to transmit the log to the external device.

5. The mobile terminal according to claim 1, wherein the confidential resource management unit comprises
a confidential data deletion unit configured to delete confidential data, when a deletion command for deleting the confidential data is included in the access control rule acquired by the access control rule query unit, and
the query requirement determination unit is configured to add, to the access control rule, the deletion command of the confidential data and to update the access control rule, when the user authentication is unsuccessful.

6. The mobile terminal according to claim 1, wherein the access control rule query unit is configured to acquire, from an access control management device, the access control rule by designating the identifier of the mobile terminal, when an access to a confidential resource associated with a specific user identity module is made in a state where the specific user identity module is not installed in the mobile terminal.

7. An access control management device, comprising:
a user management unit configured to retain user information of a mobile terminal and an access control rule to be given to the mobile terminal;
a user authentication unit configured to perform a user authentication;
an access control rule response unit configured to respond with the access control rule of the mobile terminal to an inquiry from the mobile terminal, the inquiry including a designation of at least one of an identifier of a user identity module installed in the mobile terminal and an identifier of the mobile terminal;
an access control request reception unit configured to receive, from a user, a registration request of the access control rule or a change request of the access control rule, the access control rule being for a mobile terminal or a plurality of mobile terminals;
an access control rule verification management unit configured to manage a verification rule for verifying the registration request or the change request; and
an access control rule verification unit configured to verify, according to the verification rule, the registration request or the change request; and
a query requirement determination unit configured to add, to the access control rule, at least one of a user authentication command, a lock command, and a deletion command for deleting confidential data and to update the access control rule when the mobile terminal is out of service for a certain period or more.

8. The access control management device according to claim 7, wherein the access control request reception unit is configured to receive the registration request or the change request, which includes an expiration date.

9. The access control management device according to claim 7, wherein
the access control rule response unit comprises
a push transmission unit configured to push-transmit the access control rule to the mobile terminal, when a push request is included in the registration request of the access control rule or the change request of the access control rule.

10. The access control management device according to claim 7, wherein
the access control rule verification unit comprises
a log verification unit configured to receive an access control log from the mobile terminal and to verify the access control log.

11. An access control management method for limiting an access to a confidential resource in a mobile terminal by an application program, comprising:
determining whether to update an access control rule when the application program make the access to the confidential resource, the access control rule defining whether the application program has an access authorization to the confidential resource in the mobile terminal and a determining unit;
acquiring, from an external device, the access control rule by designating at least one of an identifier of a user identity module installed in the mobile terminal and an identifier of the mobile terminal, and retaining the acquired access control rule;
determining whether the application program has the access authorization based on the access control rule;
responding to an access request based on a result of the determination;
adding, to the access control rule, at least one of a user authentication command, a lock command, and a deletion command for deleting confidential data; and
updating the access control rule when the mobile terminal is out of service for a certain period or more.

* * * * *